US008346553B2

(12) United States Patent
Abe

(10) Patent No.: US 8,346,553 B2
(45) Date of Patent: Jan. 1, 2013

(54) SPEECH RECOGNITION SYSTEM AND METHOD FOR SPEECH RECOGNITION

(75) Inventor: Kenji Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1291 days.

(21) Appl. No.: 12/034,978

(22) Filed: Feb. 21, 2008

(65) Prior Publication Data

US 2008/0228482 A1    Sep. 18, 2008

(30) Foreign Application Priority Data

Mar. 16, 2007    (JP) ................................. 2007-069123

(51) Int. Cl.
*G10L 17/00*    (2006.01)
*G10L 15/20*    (2006.01)

(52) U.S. Cl. ........................................ 704/249; 704/233
(58) Field of Classification Search .................... 704/249
See application file for complete search history.

(56) References Cited

U.S. PATENT DOCUMENTS

| 5,899,972 | A | * | 5/1999 | Miyazawa et al. | 704/249 |
| 6,122,615 | A | * | 9/2000 | Yamamoto | 704/252 |
| 2002/0052913 | A1 | * | 5/2002 | Yamada et al. | 709/202 |
| 2002/0073176 | A1 | * | 6/2002 | Ikeda et al. | 709/219 |
| 2003/0229497 | A1 | * | 12/2003 | Wilson et al. | 704/270.1 |
| 2005/0278180 | A1 | * | 12/2005 | O'Neill et al. | 704/275 |
| 2005/0283475 | A1 | | 12/2005 | Beranek et al. | |
| 2006/0136247 | A1 | * | 6/2006 | Onodera et al. | 705/1 |
| 2006/0287868 | A1 | * | 12/2006 | Ikeda et al. | 704/275 |
| 2007/0050190 | A1 | * | 3/2007 | Washio et al. | 704/249 |
| 2007/0154006 | A1 | * | 7/2007 | Onodera et al. | 379/265.01 |

FOREIGN PATENT DOCUMENTS

| JP | 10-322450 | 12/1998 |
| JP | A 11-149294 | 6/1999 |
| JP | 2000-137496 | 5/2000 |
| JP | 2000-250590 | 9/2000 |
| JP | A 2005-123869 | 5/2005 |
| JP | 2006-258212 | 10/2006 |
| WO | WO 2004/012431 A1 | 2/2004 |

OTHER PUBLICATIONS

Office Action issued by the Patent Office of Japan for corresponding Japanese Patent Application No. 2007-069123, dated May 27, 2011 (with English language translation).

* cited by examiner

*Primary Examiner* — Richemond Dorvil
*Assistant Examiner* — Olujimi Adesanya
(74) *Attorney, Agent, or Firm* — Greer, Burns & Crain, Ltd.

(57) ABSTRACT

A recognition result extraction unit and an agreement determination unit are provided. The recognition result extraction unit extracts, from a recognition result storage unit, N best solutions A and B obtained by an utterance B. The utterance B follows an utterance A corresponding to the N best solutions A and made by a speaker b who is different from a speaker of the utterance A. In a case where a repeat utterance determination unit determines that the N best solutions B are N best solutions obtained by a repeat utterance B according to the utterance A corresponding to the N best solutions A, when the best solution A and B are different each other, the agreement determination unit determines that some or all of the N best solutions A can be replaced with some or all of the N best solutions B.

17 Claims, 9 Drawing Sheets

| UTTERANCE NUMBER | A01 | | | | B01 | |
|---|---|---|---|---|---|---|
| TIME | 10:00:00 | | 10:00:01 | | 10:00:05 | |
| N BEST SOLUTION | 1 | CD | 0.95 | INTERNET | 0.85 | PC | 0.96 |
| | 2 | PC | 0.93 | INTRANET | 0.84 | CD | 0.91 |
| | 3 | GC | 0.82 | ........ | ... | GCC | 0.82 |
| | 4 | OC | 0.81 | ........ | ... | KC | 0.78 |
| | 5 | GCC | 0.78 | ........ | ... | KD | 0.71 |

N BEST SOLUTION $A_1$ / RECOGNITION SCORE

N BEST SOLUTION $A_2$ / RECOGNITION SCORE

N BEST SOLUTION $B_1$ / RECOGNITION SCORE

Fig. 2

| UTTERANCE NUMBER | A01 | | | | B01 | |
|---|---|---|---|---|---|---|
| TIME | 10:00:00 | | 10:00:01 | | 10:00:05 | |
| N BEST SOLUTION | 1 | PC | 0.98 | INTERNET | 0.86 | PC | 0.96 |
| | 2 | CD | 0.9 | INTRANET | 0.84 | CD | 0.91 |
| | 3 | GC | 0.82 | ........ | ... | GCC | 0.82 |
| | 4 | OC | 0.81 | ........ | ... | KC | 0.78 |
| | 5 | GCC | 0.78 | ........ | ... | KD | 0.71 |

N BEST SOLUTION A₁ / RECOGNITION SCORE  
N BEST SOLUTION A₂ / RECOGNITION SCORE  
N BEST SOLUTION B₁ / RECOGNITION SCORE

| FUNCTION WORD | ORDER |
|---|---|
| "Ichi-banme" | 1 |
| "Ni-banme" | 2 |
| ... | ... |
| "N-banme" | LAST |
| "Mazu" | 1 |
| "Tsugi" | 2 |
| ... | ... |
| "Owarini" | LAST |
| "Hajimeni" | 1 |
| ... | ... |
| "Saigoni" | LAST |

Fig. 7

| UTTERANCE NUMBER | | A01 | | | | B01 | | | |
|---|---|---|---|---|---|---|---|---|---|
| TIME | | 10:00:00 | | 10:00:01 | | 10:00:05 | | 10:00:07 | |
| N BEST SOLUTION | 1 | CD | 0.95 | INTERNET | 0.85 | Mazu | 0.90 | PC | 0.96 |
| | 2 | PC | 0.93 | INTRANET | 0.84 | Map | 0.65 | CD | 0.91 |
| | 3 | GC | 0.82 | ........ | ... | ... | | GCC | 0.82 |
| | 4 | OC | 0.81 | ........ | ... | ... | | KC | 0.78 |
| | 5 | GCC | 0.78 | ........ | ... | ... | | KD | 0.71 |

N BEST SOLUTION $A_1$ / RECOGNITION SCORE
N BEST SOLUTION $A_2$ / RECOGNITION SCORE
N BEST SOLUTION $B_1$ / RECOGNITION SCORE
N BEST SOLUTION $B_2$ / RECOGNITION SCORE

Fig. 8

| UTTERANCE NUMBER | A01 | | | |
|---|---|---|---|---|
| TIME | 10:00:00 | | 10:00:01 | |
| N BEST SOLUTION | 1 | CD | 0.95 | INTERNET | 0.86 |
| | 2 | PC | 0.93 | INTRANET | 0.84 |
| | 3 | GC | 0.82 | ........ | ... |
| | 4 | OC | 0.81 | ........ | ... |
| | 5 | GCC | 0.78 | ........ | ... |

N BEST SOLUTION $A_1$ — RECOGNITION SCORE

N BEST SOLUTION $A_2$ — RECOGNITION SCORE

Fig. 9

| FUNCTION WORD | A01 |
|---|---|
| Ichi-banme/Mazu/Hajimeni | CD |
| Ni-banme/Tsugi | INTERNET |

Fig. 10

SPEECH RECOGNITION SYSTEM AND METHOD FOR SPEECH RECOGNITION

BACKGROUND OF THE INVENTION

1. Field of the Invention

The present invention relates to a speech recognition system capable of recognizing utterances and method for speech recognition.

2. Description of the Related Art

Recently, for example, cases have become common where, when inquiries, complaints, consultation requests, and the like about purchased products from users are accepted by telephone, a call center to which operators who answer telephone calls from users are assigned is established. A suitable number of operators are assigned to a call center so as to quickly answer telephone calls from users.

In general, in such a call center, dialogs between operators and users are recognized using a speech recognition system to record the dialogs as the result of recognition. Recorded dialogs may be displayed on the display screen of a personal computer for an operator. When dialogs between operators and users are recorded, for example, what information users like to know can be analyzed. The result of analysis can be utilized as, for example, hints for future business operation. Moreover, the result of analysis can be utilized for operators' smooth operations by incorporating the result of analysis in manuals held by operators.

In a speech recognition system, when a dialog between an operator and a user is erroneously recognized, the content of the dialog is recorded on the basis of the result of erroneous recognition. When the content of the dialog is recorded on the basis of the result of erroneous recognition, accurate analysis cannot be performed. Thus, the erroneous recognition by the speech recognition system needs to be corrected. For example, Japanese Unexamined Patent Application Publication No. 11-149294 and Japanese Unexamined Patent Application Publication No. 2005-123869 described below are known as methods for correcting erroneous recognition by a speech recognition system.

In Japanese Unexamined Patent Application Publication No. 11-149294, there is disclosed a method for, when a speech recognition system erroneously recognizes a user's utterance, correcting the erroneous recognition by the speech recognition system by a user's reutterance (restatement). Specifically, when a restatement determination unit determines that a user's reutterance is an utterance for restatement, a recognition processing unit outputs an adjusted recognition candidate using both past recognition candidates stored in a recognition candidate registration unit and a recognition candidate obtained in the current processing. Thus, when the user can recognize the erroneous recognition, the erroneous recognition can be corrected by an utterance for restatement.

Moreover, in Japanese Unexamined Patent Application Publication No. 2005-123869, there is disclosed a call content transcription system that facilitates confirmation and correction of the result of recognition by separating the content of a call that is sent and received via telephone handsets to a part of a caller and a part of a callee. Specifically, speech from a channel on a caller's side is recognized by first speech recognition means, and speech from a channel on a callee's side is recognized by second speech recognition means. Speech recognized by the first speech recognition means and the second speech recognition means is converted to character strings by character string conversion means to be displayed on display means. The character strings displayed by the display means are edited using input means, for example, a keyboard. Thus, since the content of a call by a caller and a callee is displayed in chronological order, an editor can readily transcript the content of the call.

In a call center, the result of recognizing a dialog between an operator and a user can be displayed on the display screen of a personal computer for the operator. Thus, the operator can check whether the result of recognition is correct. In contrast, the user cannot check the result of recognition. That is to say, in many cases, a user is not conscious that a dialog between an operator and the user is recognized by a speech recognition system, and the dialog, which is the result of recognition, is recorded. Thus, even when a speech recognition system has erroneously recognized a dialog between an operator and a user, the user keeps uttering without an utterance for restatement. Accordingly, the method for correcting erroneous recognition disclosed in Japanese Unexamined Patent Application Publication No. 11-149294 cannot be applied to such a case.

On the other hand, when a speech recognition system has erroneously recognized a dialog between an operator and a user, the operator needs to correct the result of erroneous recognition. Specifically, the operator corrects the result of erroneous recognition displayed on the display screen of a personal computer by operating a keyboard. However, it is difficult to correct the result of erroneous recognition by operating a keyboard without interrupting the dialog between the operator and the user. Thus, the result of erroneous recognition may be corrected by operating a keyboard after the dialog between the operator and the user is completed. However, in this case, the operator needs to remember a place where the result of erroneous recognition has occurred, a result of correct recognition, and the like. Moreover, when the dialog between the operator and the user is recorded, the operator need not remember a place where the result of erroneous recognition has occurred, a result of correct recognition, and the like. However, it takes much time and effort to hear the recorded dialog again. Thus, the method for correcting erroneous recognition disclosed in Japanese Unexamined Patent Application Publication No. 2005-123869 cannot be applied to such a case.

SUMMARY

In view of the aforementioned problems, it is an object of the present invention to provide a speech recognition system and a speech recognition program in which, in a dialog between at least two speakers, when an utterance of one speaker is erroneously recognized, the result of erroneous recognition can be corrected without the one speaker being conscious of the action, without operation of input means such as a keyboard by the other speaker, and without interrupting the dialog.

To achieve the aforementioned object, a speech recognition system of the present invention includes an input identification unit that identifies a speaker who has made an utterance, a recognition result storage unit that, assuming that a recognition word or vocabulary having the highest recognition score of recognition scores calculated by comparing the utterance with a plurality of recognition words or vocabularies is the best solution, stores top N (N is an integer equal to or more than one) recognition words or vocabularies having high recognition scores, starting from the best solution, as N best solutions, a recognition result extraction unit that, assuming that the N best solutions extracted from the recognition result storage unit are preceding N best solutions, extracts, from the recognition result storage unit, N best solutions obtained by an utterance that chronologically follows the utterance corresponding to the preceding N best solutions and has been made by a speaker who is different from the speaker of the utterance corresponding to the preceding N best solutions as following N best solutions, a degree-of-association calculation unit that calculates a degree of association representing a likelihood that the following N best solutions are N best solutions obtained by a response utterance in response to the utterance corresponding to the preceding N best solutions, a response utterance determination unit that, when the degree of association is equal to or more than a threshold value, determines that the following N best solutions are N best solutions obtained by a response utterance in response to the utterance corresponding to the preceding N best solutions, a repeat utterance determination unit that, when the response utterance determination unit determines that the following N best solutions are N best solutions obtained by a response utterance in response to the utterance corresponding to the preceding N best solutions, determines whether the following N best solutions are N best solutions obtained by a repeat utterance in response to the utterance corresponding to the preceding N best solutions, and an agreement determination unit that, when the repeat utterance determination unit determines that the following N best solutions are N best solutions obtained by a repeat utterance in response to the utterance corresponding to the preceding N best solutions, assuming that the best solution of the preceding N best solutions is the preceding best solution and the best solution of the following N best solutions is the following best solution, determines whether the preceding best solution and the following best solution agree with each other, and when the preceding best solution and the following best solution do not agree with each other, determines that some or all of the preceding N best solutions can be replaced with some or all of the following N best solutions.

In the speech recognition system of the present invention, the degree-of-association calculation unit calculates a degree of association representing a likelihood that the following N best solutions are N best solutions obtained by a response utterance in response to the utterance corresponding to the preceding N best solutions. In this case, the following N best solutions are N best solutions obtained by an utterance that chronologically follows the utterance corresponding to the preceding N best solutions and has been made by a speaker who is different from the speaker of the utterance corresponding to the preceding N best solutions. For example, the utterance corresponding to the preceding N best solutions may be an utterance made by a user, and the utterance corresponding to the following N best solutions may be an utterance made by an operator in a call center. In this case, when the degree of association is equal to or more than the threshold value, the response utterance determination unit determines that the following N best solutions are N best solutions obtained by a response utterance in response to the utterance corresponding to the preceding N best solutions. The repeat utterance determination unit determines whether the following N best solutions are N best solutions obtained by a repeat utterance in response to the utterance corresponding to the preceding N best solutions. When the repeat utterance determination unit determines that the following N best solutions are N best solutions obtained by a repeat utterance in response to the utterance corresponding to the preceding N best solutions, the agreement determination unit determines whether the preceding best solution and the following best solution agree with each other. When the preceding best solution and the following best solution do not agree with each other, the agreement determination unit determines that the preceding best solution is incorrect.

In the aforementioned case, in general, operators are constantly trained so that they speak clearly compared with users. Moreover, operators can intentionally speak so that a correct result of recognition can be obtained. Moreover, in a case where the speech recognition system is provided in a call center, utterances made by users are recognized via telephone lines, and utterances made by operators are recognized not via telephone lines, information of utterances made by users may be deteriorated much compared with information of utterances made by operators due to the intrusion of noise in telephone lines or the intervention of various types of filter. Because of such a reason, the agreement determination unit according to the present invention determines that some or all of the preceding N best solutions can be replaced with some or all of the following N best solutions. Thus, in a dialog between a user and an operator, when the user's utterance is erroneously recognized, the result of erroneous recognition can be corrected without the user being conscious of the action, without operation of input means such as a keyboard by the operator, and without interrupting the dialog.

In this case, N of the preceding N best solutions may be the same as or different from N of the following N best solutions.

The speech recognition system in the present invention preferably further includes a recognition result correction unit that, when the agreement determination unit determines that the preceding best solution and the following best solution do not agree with each other, updates the preceding best solution in the recognition result storage unit, in which the preceding N best solutions are stored, to the following best solution, and a result output unit that outputs the following best solution updated by the recognition result correction unit.

In the aforementioned arrangement, the recognition result correction unit updates the preceding best solution in the recognition result storage unit, in which the preceding N best solutions are stored, to the following best solution. Thus, the result output unit can output the updated following best solution.

The speech recognition system in the present invention preferably further includes a correction history generating unit that generates history data representing a history of updates applied by the recognition result correction unit, and an output presentation unit that presents the history data generated by the correction history generating unit.

In the aforementioned arrangement, the correction history generating unit generates history data representing a history of updates. The output presentation unit presents the history data. Thus, for example, an operator can check a history showing that the result of erroneous recognition has been corrected.

In the speech recognition system in the present invention, in a case where the response utterance determination unit determines that the following N best solutions are N best solutions obtained by a response utterance in response to the utterance corresponding to the preceding N best solutions, when the recognition score of the following best solution of the following N best solutions is equal to or more than a predetermined recognition score and when both (1) and (2) described below are satisfied, the repeat utterance determination unit preferably determines that the following N best solutions are N best solutions obtained by a repeat utterance in response to the utterance corresponding to the preceding N best solutions.

(1) A solution in the preceding N best solutions agrees with the following best solution of the following N best solutions.

(2) The recognition score of the aforementioned solution in the preceding N best solutions, which agrees with the following best solution, is equal to or more than a predetermined recognition score, or the aforementioned solution in the preceding N best solutions is placed in a preset rank relative to the preceding best solution or higher, the aforementioned solution agreeing with the following best solution.

In the aforementioned arrangement, when the aforementioned conditions are satisfied, the repeat utterance determination unit can determine that the following N best solutions are N best solutions obtained by a repeat utterance in response to the utterance corresponding to the preceding N best solutions.

The speech recognition system in the present invention preferably further includes a co-occurrence information storage unit that stores co-occurrence information representing co-occurrence relationships between recognition vocabularies and/or a semantic attribute storage unit that stores semantic attributes representing the meanings of recognition vocabularies, and a comparison process changing unit that, when the agreement determination unit determines that the preceding best solution and the following best solution agree with each other, changes a method for comparing an utterance with a plurality of recognition vocabularies on the basis of the co-occurrence information and/or the semantic attributes.

In this case, when the preceding best solution and the following best solution agree with each other, the reliability of the solutions is high. Thus, in such a case, the comparison process changing unit changes the method for comparing an utterance with recognition vocabularies on the basis of the co-occurrence information and/or the semantic attributes.

In an example, the comparison process changing unit changes the comparison method so that the recognition scores of recognition vocabularies having a co-occurrence relationship with the preceding best solution and the following best solution or the recognition scores of recognition vocabularies having meanings related to the preceding best solution and the following best solution are higher than the recognition scores of recognition vocabularies other than these recognition vocabularies. Specifically, when the preceding best solution and the following best solution are "PC", for example, a predetermined recognition score is assigned to recognition vocabularies related to computer terms so that the recognition scores of recognition vocabularies regarding computer terms having meanings related to "PC" are higher than the recognition scores of recognition vocabularies other than computer terms. That is to say, when the preceding best solution obtained by an utterance made by a user and the following best solution obtained by an utterance made by an operator are "PC", it can be determined that the reliability of the result of recognition is very high. Thus, it can be determined that the content of the dialog is also related to computers. Moreover, the probability that the content of subsequent utterances is related to computers is high. Thus, when the comparison process changing unit changes the comparison method so as to assign the predetermined recognition score to the recognition vocabularies related to computer terms, the accuracy rate of recognition by the speech recognition system can be improved.

In another example, the comparison process changing unit changes the comparison method so as to set recognition vocabularies having a co-occurrence relationship with the preceding best solution and the following best solution or recognition vocabularies having meanings related to the preceding best solution and the following best solution as recognition vocabularies that are subjected to comparison and set the other recognition vocabularies as recognition vocabularies that are not subjected to comparison. Specifically, when the preceding best solution and the following best solution are "PC", the comparison method is changed so as to set recognition vocabularies regarding computer terms having meanings related to "PC" as recognition vocabularies that are subjected to comparison and set the other recognition vocabularies as recognition vocabularies that are not subjected to comparison. That is to say, when the preceding best solution obtained by an utterance made by a user and the following best solution obtained by an utterance made by an operator are "PC", it can be determined that the reliability of the result of recognition is very high. Thus, it can be determined that the content of the dialog is also related to computers. Moreover, the probability that the content of subsequent utterances is related to computers is high. Thus, when the comparison process changing unit changes the comparison method so as to set recognition vocabularies regarding computer terms as recognition vocabularies that are subjected to comparison and set the other recognition vocabularies as recognition vocabularies that are not subjected to comparison, the accuracy rate of recognition by the speech recognition system can be improved.

The speech recognition system according to any one of Claims 1 to 4, wherein the degree-of-association calculation unit calculates a degree of association on the basis of at least one of the following (1) to (4).

(1) The number of solutions in which individual solutions in the preceding N best solutions agree with individual solutions in the following N best solutions (2) Regarding solutions in which individual solutions in the preceding N best solutions agree with individual solutions in the following N best solutions, the differences between the ranks based on the recognition scores in the preceding N best solutions and the ranks based on the recognition scores in the following N best solutions (3) The time difference between time at which the preceding N best solutions have been output and time at which the following N best solutions have been output (4) In a case where a plurality of groups of the preceding N best solutions are obtained by comparing a first utterance with a plurality of recognition vocabularies, and a plurality of groups of the following N best solutions are obtained by comparing a second utterance made by a speaker who is different from a speaker of the first utterance with the plurality of recognition vocabularies, the differences between the positions, on the time series, at which the plurality of groups of the preceding N best solutions appear and the positions, on the time series, at which the plurality of groups of the following N best solutions appear In the aforementioned arrangement, the degree-of-association calculation unit can calculate a degree of association on the basis of at least one of (1) to (4) described above.

In the speech recognition system in the present invention, it is preferable that, the larger the number of solutions, in which the individual solutions in the preceding N best solutions agree with the individual solutions in the following N best solutions, and the smaller the differences between, regarding the solutions, in which the individual solutions in the preceding N best solutions agree with the individual solutions in the following N best solutions, the ranks based on the recognition scores in the preceding N best solutions and the ranks based on the recognition scores in the following N best solutions, the higher the degree of association calculated by the degree-of-association calculation unit.

In this case, the larger the number of solutions and the smaller the differences between the ranks, the higher the probability that the following N best solutions are N best solutions obtained by a response utterance in response to the utterance corresponding to the preceding N best solutions.

Thus, in such a case, the degree-of-association calculation unit calculates a high degree of association. On the other hand, conversely, the smaller the number of solutions and the larger the differences between the ranks, the lower the probability that the following N best solutions are N best solutions obtained by a response utterance in response to the utterance corresponding to the preceding N best solutions. Thus, in such a case, the degree-of-association calculation unit calculates a low degree of association. Thus, when the degree of association is equal to or more than the threshold value, the response utterance determination unit can determine that the following N best solutions are N best solutions obtained by a response utterance in response to the utterance corresponding to the preceding N best solutions.

The speech recognition system in the present invention preferably further includes a time information control unit that assigns time information representing the current time to the N best solutions, and writes the N best solutions, to which the time information has been assigned, to the recognition result storage unit. It is preferable that, the smaller the time difference between the current time represented by time information assigned to the preceding N best solutions and the current time represented by time information assigned to the following N best solutions, the higher the degree of association calculated by the degree-of-association calculation unit.

In this case, the smaller the time difference, the higher the probability that the following N best solutions are N best solutions obtained by a response utterance in response to the utterance corresponding to the preceding N best solutions. Thus, in such a case, the degree-of-association calculation unit calculates a high degree of association. On the other hand, conversely, the larger the time difference, the lower the probability that the following N best solutions are N best solutions obtained by a response utterance in response to the utterance corresponding to the preceding N best solutions. Thus, in such a case, the degree-of-association calculation unit calculates a low degree of association. Thus, when the degree of association is equal to or more than the threshold value, the response utterance determination unit can determine that the following N best solutions are N best solutions obtained by a response utterance in response to the utterance corresponding to the preceding N best solutions.

In the speech recognition system in the present invention, it is preferable that, in a case where a plurality of groups of the preceding N best solutions are obtained by comparing a first utterance with a plurality of recognition vocabularies, and a plurality of groups of the following N best solutions are obtained by comparing a second utterance made by a speaker who is different from a speaker of the first utterance with the plurality of recognition vocabularies, the smaller the differences between the positions, on the time series, at which the plurality of groups of the preceding N best solutions appear and the positions, on the time series, at which the plurality of groups of the following N best solutions appear, the higher the degree of association calculated by the degree-of-association calculation unit.

In this case, the smaller the differences between the positions, the higher the probability that the following N best solutions are N best solutions obtained by a response utterance in response to the utterance corresponding to the preceding N best solutions. Thus, in such a case, the degree-of-association calculation unit calculates a high degree of association. On the other hand, conversely, the larger the differences between the positions, the lower the probability that the following N best solutions are N best solutions obtained by a response utterance in response to the utterance corresponding to the preceding N best solutions. Thus, in such a case, the degree-of-association calculation unit calculates a low degree of association. Thus, when the degree of association is equal to or more than the threshold value, the response utterance determination unit can determine that the following N best solutions are N best solutions obtained by a response utterance in response to the utterance corresponding to the preceding N best solutions.

The speech recognition system in the present invention preferably further includes a function word dictionary that stores function words representing the positions at which utterances appear in association with the positions. When the following best solution in any one group of the following N best solutions out of the plurality of groups of the following N best solutions agrees with a function word, the degree-of-association calculation unit preferably sets the position represented by the function word as the position at which a group of the following N best solutions appear, the group of the following N best solutions being chronologically next to the one group of the following N best solutions including the following best solution, which agrees with the function word.

In the aforementioned arrangement, when the following best solution in any one group of the following N best solutions out of the plurality of groups of the following N best solutions agrees with a function word, the degree-of-association calculation unit sets the position represented by the function word as the position at which a group of the following N best solutions appear, the group of the following N best solutions being chronologically next to the one group of the following N best solutions including the following best solution, which agrees with the function word. In this case, a function word represents the position at which an utterance appears. For example, a function word "Mazu" (a Japanese word meaning "first") represents the position of 1. Moreover, a function word "Tsugi" (a Japanese word meaning "next") represents the position of 2. Thus, a degree of association can be calculated more accurately than in a mode in which a degree of association is calculated simply on the basis of the difference between the positions on the time series.

The speech recognition system in the present invention preferably further includes a function word extraction unit that extracts, from the function word dictionary, function words corresponding to the positions, on the time series, at which the plurality of groups of the preceding N best solutions appear. The output presentation unit preferably presents the function words extracted by the function word extraction unit in association with the individual preceding best solutions of the plurality of groups of the preceding N best solutions.

In the aforementioned arrangement, the function word extraction unit extracts, from the function word dictionary, function words corresponding to the positions, on the time series, at which the plurality of groups of the preceding N best solutions appear. The output presentation unit presents the extracted function words in association with the individual preceding best solutions of the plurality of groups of the preceding N best solutions. In this case, for example, when the preceding best solution presented on the output presentation unit is incorrect, an operator can make a repeat utterance immediately after speaking a function word presented in association with the preceding best solution so as to correct the preceding best solution, which has been erroneously recognized. Thus, for example, even in a case where, before the operator repeatedly speaks the correct preceding best solution, the operator has made another utterance, when the operator repeatedly speaks the correct preceding best solution immediately after speaking the function word, the position, on the time series, at which the preceding N best solutions including the incorrect preceding best solution appear and the position at which the following N best solutions obtained by the repeat utterance made by the operator are the same. Thus, the degree-of-association calculation unit can calculate the maximum degree of association. As a result, the response utterance determination unit can reliably determine that the following N best solutions are N best solutions obtained by a response utterance in response to the utterance corresponding to the preceding N best solutions.

To achieve the aforementioned object, a speech recognition program of the present invention causes a computer that includes a recognition result storage unit that, assuming that a recognition vocabulary having the highest recognition score of recognition scores calculated by comparing an utterance with a plurality of recognition vocabularies is the best solution, stores top N (N is an integer equal to or more than one) recognition vocabularies having high recognition scores, starting from the best solution, as N best solutions to perform an input identification step of identifying a speaker who has made the utterance, a recognition result extraction step of, assuming that the N best solutions extracted from the recognition result storage unit are preceding N best solutions, extracting, from the recognition result storage unit, N best solutions obtained by an utterance that chronologically follows the utterance corresponding to the preceding N best solutions and has been made by a speaker who is different from the speaker of the utterance corresponding to the preceding N best solutions as following N best solutions, a degree-of-association calculation step of calculating a degree of association representing a likelihood that the following N best solutions are N best solutions obtained by a response utterance in response to the utterance corresponding to the preceding N best solutions, a response utterance determination step of, when the degree of association is equal to or more than a threshold value, determining that the following N best solutions are N best solutions obtained by a response utterance in response to the utterance corresponding to the preceding N best solutions, a repeat utterance determination step of, when the response utterance determination step determines that the following N best solutions are N best solutions obtained by a response utterance in response to the utterance corresponding to the preceding N best solutions, determining whether the following N best solutions are N best solutions obtained by a repeat utterance in response to the utterance corresponding to the preceding N best solutions, and an agreement determination step of, when the repeat utterance determination step determines that the following N best solutions are N best solutions obtained by a repeat utterance in response to the utterance corresponding to the preceding N best solutions, assuming that the best solution of the preceding N best solutions is the preceding best solution and the best solution of the following N best solutions is the following best solution, determining whether the preceding best solution and the following best solution agree with each other, and when the preceding best solution and the following best solution do not agree with each other, determining that some or all of the preceding N best solutions can be replaced with some or all of the following N best solutions.

In the speech recognition program of the present invention, advantages similar to those in the aforementioned speech recognition system can be achieved.

BRIEF DESCRIPTION OF THE DRAWINGS

FIG. 2 shows an example of the structure of data in a recognition result storage unit in the speech recognition system;

FIG. 3 shows an example of the structure of data in the recognition result storage unit after the data is updated by a recognition result correction unit in the speech recognition system;

FIG. 7 shows an example of the structure of data in a function word dictionary in the speech recognition system;

FIG. 8 shows an example of the structure of data in the recognition result storage unit in the speech recognition system;

FIG. 9 shows an example of the structure of data in the recognition result storage unit before a speaker b makes an utterance B and after a speaker a makes an utterance A; and FIG. 10 is a schematic diagram showing an example of a display screen presented on the output presentation unit in the speech recognition system before the speaker b makes the utterance B and after the speaker a makes the utterance A.

DESCRIPTION OF THE PREFERRED EMBODIMENTS

A more specific embodiment according to the present invention will now be described in detail with reference to the drawings.

Figure 1:
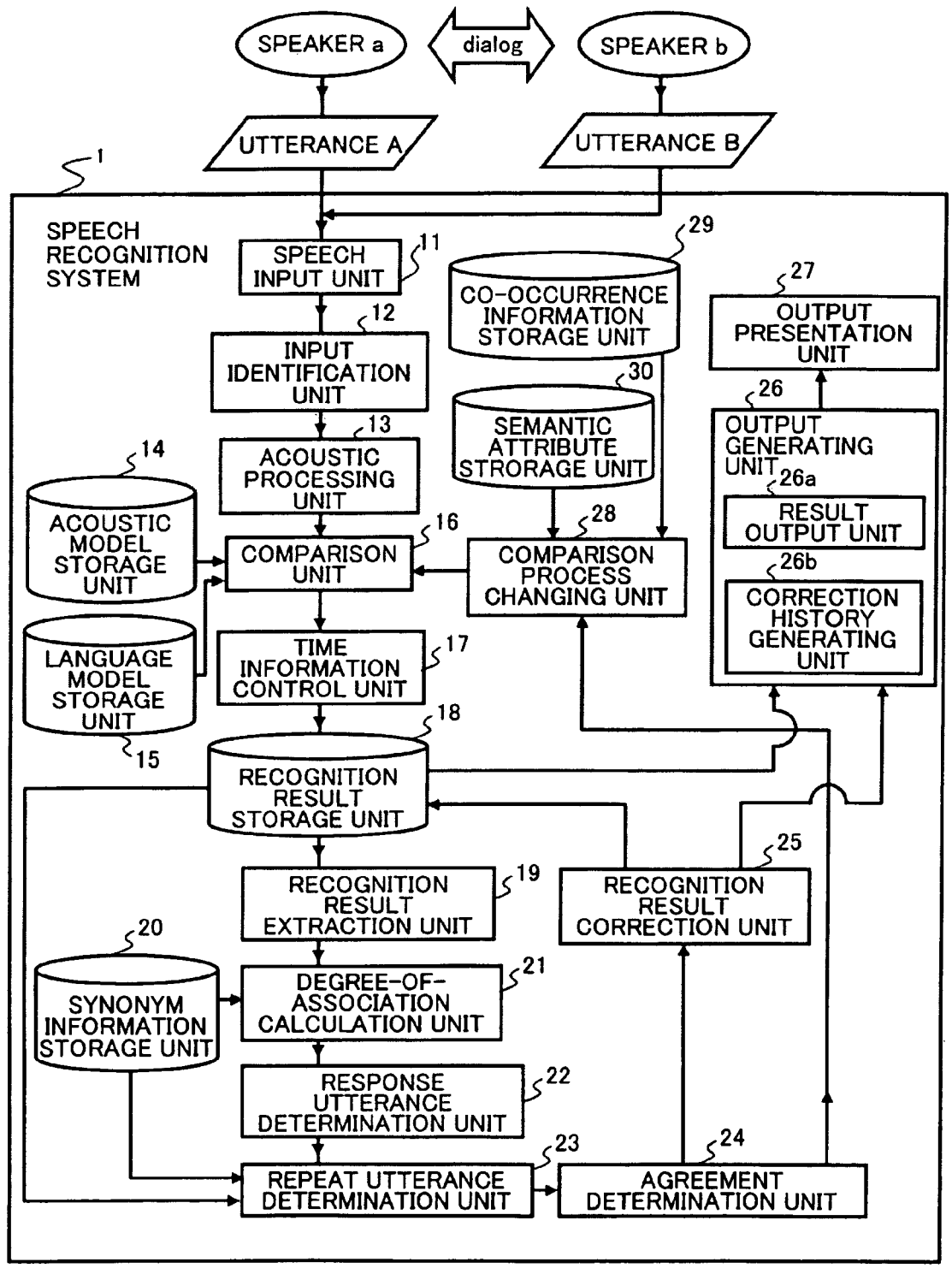
FIG. 1 is a schematic block diagram showing the outline structure of a speech recognition system according to an embodiment of the present invention.

FIG. 1 is a block diagram showing the outline structure of a speech recognition system 1 according to this embodiment. In this embodiment, a case where the speech recognition system 1 is provided in a call center, and a speaker a who is a user and a speaker b who is an operator have a conversation (call) by telephone will be described as an example. Specifically, a case where, after the speaker a makes an utterance A "PC Nitsuite Oshiete. Ato Internet Mo." (a Japanese phrase meaning "Teach me about a PC, as well as the Internet."), the speaker b makes an utterance B "Mazu PC Nitsuite Desuga." (a Japanese phrase meaning "First, allow me to start with a PC."), will be described.

In the following description, in a case where N best solutions and the best solution are described, only when distinction needs to be made particularly, the description is made with a lower case number being added to identify each of them, for example, N best solutions $A_1$; and when distinction need not be made particularly or when they are collectively called, the description is made without a lower case number being added, for example, N best solutions A.

[Structure of Speech Recognition System]

The speech recognition system 1 according to this embodiment includes a speech input unit 11, an input identification unit 12, an acoustic processing unit 13, an acoustic model storage unit 14, a language model storage unit 15, a comparison unit 16, a time information control unit 17, a recognition result storage unit 18, a recognition result extraction unit 19, a synonym information storage unit 20, a degree-of-association calculation unit 21, a response utterance determination unit 22, a repeat utterance determination unit 23, an agreement determination unit 24, a recognition result correction unit 25, an output generating unit 26, an output presentation unit 27, a comparison process changing unit 28, a co-occurrence information storage unit 29, and a semantic attribute storage unit 30.

The speech input unit 11 accepts a dialog between two speakers, i.e., the utterance A made by the speaker a and the utterance B made by the speaker b. The speech input unit 11 further converts the utterance A made by the speaker a to utterance data A and the utterance B made by the speaker b to utterance data B. The speech input unit 11 outputs the utterance data A and the utterance data B obtained by the conversion to the input identification unit 12. The speech input unit 11 may accept, for example, a dialog between a single user and a plurality of operators other than a dialog between the aforementioned two speakers. Alternatively, the speech input unit 11 may accept a dialog between a plurality of users and a single operator. Alternatively yet, the speech input unit 11 may accept a dialog between a plurality of users and a plurality of operators. The speech input unit 11 may accept a dialog log that is recorded in advance instead of a real-time dialog.

The input identification unit 12 identifies a speaker who has made an utterance. Specifically, the input identification unit 12 identifies the utterance data A and the utterance data B output from the speech input unit 11, and assigns, to the utterance data A, an utterance number unique to the utterance A and, to the utterance data B, an utterance number unique to the utterance B. In this case, the input identification unit 12 can identify the utterance data A and the utterance data B output from the speech input unit 11, using, for example, a known technique for separately recording telephone receive signals and transmit signals, a process of determining the sex, or a process of identifying a speaker. In this embodiment, the input identification unit 12 assigns Utterance Number A01 to the utterance data A representing "PC Nitsuite Oshiete. Ato Internet Mo." output from the speech input unit 11. The input identification unit 12 further assigns Utterance Number B01 to the utterance data B representing "Mazu PC Nitsuite Desuga.". In this case, when the dialog between the speaker a and the speaker b continues, Utterance Numbers A02, A03, A04, . . . and Utterance Numbers B02, B03, B04, . . . are sequentially assigned to the utterance data of the speaker a and the utterance data of the speaker b, respectively. The input identification unit 12 outputs, to the acoustic processing unit 13, the utterance data A, to which the utterance numbers have been assigned, and the utterance data B, to which the utterance numbers have been assigned.

The acoustic processing unit 13 converts the utterance data A output from the input identification unit 12 to features A and converts the utterance data B output from the input identification unit 12 to features B. Multi-dimensional vectors that include MFCC (Mel-Frequency Cepstral Coefficients), LPC cepstrum, power (the integral of spectrum), or the linear or quadratic regression coefficient may be used as features. Moreover, multi-dimensional vectors that are obtained by reducing the dimensions of MFCC, LPC cepstrum, power, or the linear or quadratic regression coefficient by, for example, principal component analysis or discriminant analysis may be used as features. In this case, the features are not limited to a specific type. The acoustic processing unit 13 outputs the features A and the features B obtained by the conversion to the comparison unit 16. The acoustic processing unit 13 may include a memory for storing the features A and the features B obtained by the conversion.

The acoustic model storage unit 14 stores data obtained by statistically modeling information on what phoneme tends to have what feature. Examples of the acoustic model storage unit 14 include Hidden Markov Model (HMM) and Dynamic Programming (DP).

The language model storage unit 15 stores a plurality of recognition vocabularies and information on the plurality of recognition vocabularies. The information on the recognition vocabularies includes, for example, IDs, expressions, and pronunciations (for example, defined in a sequence of phonemes) uniquely assigned to the recognition vocabularies. The information on the recognition vocabularies may further include predetermined information, for example, information of a weight for each vocabulary that is added at the time of calculating a recognition score and rules (grammatical information) for connection between the recognition vocabularies.

The comparison unit 16 calculates recognition scores on the basis of the utterance A and the plurality of recognition vocabularies stored in the language model storage unit 15, using the features A obtained by the conversion by the acoustic processing unit 13. A recognition score may be referred to as a degree of agreement, a likelihood, or a degree of confidence. As the result of calculation of recognition scores, assuming that a recognition vocabulary having the highest recognition score is the best solution A, the comparison unit 16 outputs top N (N is an integer equal to or more than one) recognition vocabularies having high recognition scores, starting from the best solution A, as N best solutions A. Moreover, the comparison unit 16 calculates recognition scores on the basis of the utterance B and the plurality of recognition vocabularies stored in the language model storage unit 15, using the features B obtained by the conversion by the acoustic processing unit 13. As the result of calculation of recognition scores, assuming that a recognition vocabulary having the highest recognition score is the best solution B, the comparison unit 16 outputs top N (N is an integer equal to or more than one) recognition vocabularies having high recognition scores, starting from the best solution B, as N best solutions B.

Specifically, the comparison unit 16 extracts P (P is an integer equal to or more than one) utterance sections from the features A obtained by the conversion by the acoustic processing unit 13. The comparison unit 16 extracts a sequence of phonemes (a sequence of symbols) for each of the P utterance sections by comparing the extracted utterance sections with the data stored in the acoustic model storage unit 14. The comparison unit 16 outputs the N best solutions A corresponding to each of the P utterance sections by comparing the extracted sequence of phonemes with the plurality of recognition vocabularies stored in the language model storage unit 15. Moreover, the comparison unit 16 extracts Q (Q is an integer equal to or more than one) utterance sections from the features B obtained by the conversion by the acoustic processing unit 13. The comparison unit 16 extracts a sequence of phonemes (a sequence of symbols) for each of the Q utterance sections by comparing the extracted utterance sections with the data stored in the acoustic model storage unit 14. The comparison unit 16 outputs the N best solutions B corresponding to each of the Q utterance sections by comparing the extracted sequence of phonemes with the plurality of recognition vocabularies stored in the language model storage unit 15.

In this case, actually, the comparison unit 16 extracts all utterance sections in the utterance A, for example, "PC", "Nitsuite", "Oshiete", "Ato", "Internet", and "Mo", from the features A representing "PC Nitsuite Oshiete. Ato Internet Mo.". However, in this embodiment, the description is made assuming that the comparison unit 16 extracts two utterance sections for "PC" and "Internet" from the features A, for the sake of simplifying the description. Specifically, the comparison unit 16 extracts sequences of phonemes for "PC" and "Internet" by comparing the extracted utterance sections for "PC" and "Internet" with the data stored in the acoustic model storage unit 14. The comparison unit 16 outputs the N best solutions A corresponding to each of the two utterance sections for "PC" and "Internet" by comparing the extracted sequences of phonemes for "PC" and "Internet" with the plurality of recognition vocabularies stored in the language model storage unit 15.

Moreover, actually, the comparison unit 16 extracts all utterance sections in the utterance B, for example, "Mazu", "PC", "Nitsuite", and "Desuga", from the features B representing "Mazu PC Nitsuite Desuga.". However, in this embodiment, the description is made assuming that the comparison unit 16 extracts only a single utterance section for "PC" from the features B, for the sake of simplifying the description. Specifically, the comparison unit 16 extracts a sequence of phonemes for "PC" by comparing the extracted utterance section for "PC" with the data stored in the acoustic model storage unit 14. The comparison unit 16 outputs the N best solutions B corresponding to the utterance section for "PC" by comparing the extracted sequence of phonemes for "PC" with the plurality of recognition vocabularies stored in the language model storage unit 15.

In the case shown in FIG. 1, an example in which the speech input unit 11, the input identification unit 12, the acoustic processing unit 13, and the comparison unit 16, described above, each include a single module, is described. However, the present invention is not limited to this case. That is to say, the speech input unit 11, the input identification unit 12, the acoustic processing unit 13, and the comparison unit 16, described above, each may include, for example, a plurality of modules for individual speakers.

The time information control unit 17 assigns time information representing the current time to the N best solutions A output from the comparison unit 16. Moreover, the time information control unit 17 assigns time information representing the current time to the N best solutions B output from the comparison unit 16. The time information control unit 17 writes the N best solutions A, to which the time information has been assigned, to the recognition result storage unit 18. Moreover, the time information control unit 17 writes the N best solutions B, to which the time information has been assigned, to the recognition result storage unit 18.

The recognition result storage unit 18 stores the N best solutions A and the N best solutions B written by the time information control unit 17. FIG. 2 shows an example of the structure of data in the recognition result storage unit 18. Specifically, the recognition result storage unit 18 stores the N best solutions A and the N best solutions B as a recognition result storage table 18a. In an example shown in FIG. 2, utterance numbers, times, and N best solutions are stored in the recognition result storage table 18a. Specifically, A01 representing "PC Nitsuite Oshiete. Ato Internet Mo." and B01 representing "Mazu PC Nitsuite Desuga." are stored in the recognition result storage table 18a as utterance numbers.

N best solutions $A_1$ corresponding to the utterance section for "PC" and N best solutions $A_2$ corresponding to the utterance section for "Internet" are associated with Utterance Number A01. Recognition scores of 0.95, 0.93, 0.82, 0.81, and 0.78 are associated with the N best solutions $A_1$ "CD", "PC", "GC", "OC", and "GCC", respectively. Recognition scores of 0.86, 0.84, . . . are associated with the N best solutions $A_2$ "Internet", "intranet", . . . , respectively. That is to say, in each of the N best solutions $A_1$ and the N best solutions $A_2$, five (N=5) recognition vocabularies are listed in descending order of recognition scores. In the example shown in FIG. 2, the best solution $A_1$ (a recognition vocabulary having the highest recognition score) of the N best solutions $A_1$ is "CD" (the recognition score of 0.95). That is to say, even though the speaker a has spoken "PC", the best solution $A_1$ is "CD", and the recognition result is incorrect. Moreover, the best solution $A_2$ (a recognition vocabulary having the highest recognition score) of the N best solutions $A_2$ is "Internet" (the recognition score of 0.86). Moreover, time "10:00:00" (ten hours, zero minutes, and zero seconds) assigned by the time information control unit 17 is associated with the N best solutions $A_1$. Time "10:00:01" (ten hours, zero minutes, and one second) assigned by the time information control unit 17 is associated with the N best solutions $A_2$.

N best solutions $B_1$ corresponding to the utterance section for "PC" are associated with Utterance Number B01. Recognition scores of 0.96, 0.91, 0.82, 0.78, and 0.71 are associated with the N best solutions $B_1$ "PC", "CD", "GCC", "KC", and "KD", respectively. That is to say, in the N best solutions $B_1$, five (N=5) recognition vocabularies are listed in descending order of recognition scores. In the example shown in FIG. 2, the best solution $B_1$ (a recognition vocabulary having the highest recognition score) of the N best solutions $B_1$ is "PC" (the recognition score of 0.96). Moreover, time "10:00:05" (ten hours, zero minutes, and five seconds) assigned by the time information control unit 17 is associated with the N best solutions $B_1$.

The recognition result extraction unit 19 extracts, from the recognition result storage unit 18, the N best solutions A (preceding N best solutions) and the N best solutions B (following N best solutions) obtained by the utterance B. The utterance B chronologically follows the utterance A corresponding to the N best solutions A and has been made by the speaker b who is different from the speaker of the utterance A corresponding to the N best solutions A. In this embodiment, it is assumed that the recognition result extraction unit 19 extracts, from the recognition result storage unit 18, the N best solutions $A_1$ corresponding to the utterance section for "PC" and the N best solutions $B_1$ corresponding to the utterance section for "PC". The recognition result extraction unit 19 outputs the extracted N best solutions $A_1$ and N best solutions $B_1$ to the degree-of-association calculation unit 21.

The synonym information storage unit 20 stores information on synonyms for recognition vocabularies. A synonym is a word that has the same meaning as a recognition vocabulary but is different in pronunciation from the recognition vocabulary. For example, synonyms "Pasokon" (a Japanese word meaning "a personal computer") and "personal computer" for a recognition vocabulary "PC" are stored in the synonym information storage unit 20. Moreover, for example, a synonym "Net" for a recognition vocabulary "Internet" is stored in the synonym information storage unit 20.

The degree-of-association calculation unit 21 calculates a degree of association representing a likelihood that the N best solutions $B_1$ are N best solutions obtained by a response utterance B in response to the utterance A corresponding to the N best solutions $A_1$. Specifically, the degree-of-association calculation unit 21 calculates a degree of association on the basis of the number of solutions in which individual solutions in the N best solutions $A_1$ agree with individual solutions in the N best solutions $B_1$, and, regarding the solutions, in which the individual solutions in the N best solutions $A_1$ agree with the individual solutions in the N best solutions $B_1$, the differences between the ranks based on the recognition scores in the N best solutions $A_1$ and the ranks based on the recognition scores in the N best solutions $B_1$. In this case, the degree-of-association calculation unit 21 preferably refers to the synonym information storage unit 20 when determining whether the individual solutions in the N best solutions $A_1$ agree with the individual solutions in the N best solutions $B_1$. In this arrangement, even in a case where corresponding solutions are different from each other, when one of the corresponding solutions agrees with a synonym for the other solution or when synonyms for the corresponding solutions agree with each other, the degree-of-association calculation unit 21 can determine that the corresponding solutions agree with each other.

In this embodiment, the solutions, in which the individual solutions in the N best solutions $A_1$ agree with the individual solutions in the N best solutions $B_1$, are three solutions "CD", "PC", and "GCC". Moreover, in the N best solutions $A_1$, "CD" ranks first, "PC" ranks second, and "GCC" ranks fifth. Moreover, in the N best solutions $B_1$, "PC" ranks first, "CD" ranks second, and "GCC" ranks third. In such a case, in this embodiment, the degree-of-association calculation unit 21 calculates the degree of association using Equation 1 described below. In Equation 1 described below, X, Y, and Z represent predetermined positive constants. In this case, in Equation 1 described below, an arrangement in which a relationship such as X>Y>Z is established may be adopted. Moreover, | | represents an absolute value. If the rank of "CD" in the N best solutions $A_1$ and the rank of "CD" in the N best solutions $B_1$ were the same, X would be divided by zero in Equation 1 described below, so that the degree of association would be infinite. Thus, in such a case, in this embodiment, X/0 is replaced with 1.5X. Similarly, when there is no difference between the ranks of "PC" or "GCC", correspondingly, Y/0 is replaced with 1.5Y, or Z/0 is replaced with 1.5Z.

$$\text{Degree of Association} = X/(|\text{Difference between Ranks of "CD"}|) + Y/(|\text{Difference between Ranks of "PC"}|) + Z/(|\text{Difference between Ranks of "GCC"}|) \quad \text{[Equation 1]}$$

In this embodiment, the degree of association is X+Y+Z/2 according to Equation 1 described above. That is to say, Equation 1 described above is an equation in which, the larger the number of solutions, described above, and the smaller the differences between the ranks, described above, the higher the degree of association. On the other hand, conversely, Equation 1 described above is an equation in which, the smaller the number of solutions, described above, and the larger the differences between the ranks, described above, the lower the degree of association. In this case, in Equation 1 described above, when the number of solutions in which the individual solutions in the N best solutions $A_1$ agree with the individual solutions in the N best solutions $B_1$ is zero, the degree of association is zero. The degree-of-association calculation unit 21 outputs the calculated degree of association to the response utterance determination unit 22.

In the aforementioned description, a case is described where the degree-of-association calculation unit 21 calculates a degree of association on the basis of the number of solutions in which the individual solutions in the N best solutions $A_1$ agree with the individual solutions in the N best solutions $B_1$, and, regarding the solutions, in which the individual solutions in the N best solutions $A_1$ agree with the individual solutions in the N best solutions $B_1$, the differences between the ranks based on the recognition scores in the N best solutions $A_1$ and the ranks based on the recognition scores in the N best solutions $B_1$. However, the present invention is not limited to this case. That is to say, the degree-of-association calculation unit 21 may calculate a degree of association on the basis of the number of solutions in which the individual solutions in the N best solutions $A_1$ agree with the individual solutions in the N best solutions $B_1$. Alternatively, the degree-of-association calculation unit 21 may calculate a degree of association on the basis of, regarding the solutions, in which the individual solutions in the N best solutions $A_1$ agree with the individual solutions in the N best solutions $B_1$, the differences between the ranks based on the recognition scores in the N best solutions $A_1$ and the ranks based on the recognition scores in the N best solutions $B_1$.

In the aforementioned description, a case is described where the degree-of-association calculation unit 21 calculates a degree of association using Equation 1 described above. However, the present invention is not limited to this case. For example, the degree-of-association calculation unit 21 may calculate a degree of association using Equation 1-a in which an exponential function is used, described below. In this case, in Equation 1-a described below, A represents a predetermined positive constant. That is to say, the degree-of-association calculation unit 21 can use any equation as long as the degree-of-association calculation unit 21 can calculate a degree of association using an equation in which, the larger the number of solutions, described above, and the smaller the differences between the ranks, described above, the higher the degree of association; and the smaller the number of solutions, described above, and the larger the differences between the ranks, described above, the lower the degree of association.

$$\text{Degree of Association} = (X/A^{\text{Difference between Ranks of "CD"}}) + (Y/A^{\text{Difference between Ranks of "PC"}}) + (Z/A^{\text{Difference between Ranks of "GCC"}}) \quad \text{[Equation 1-a]}$$

X, Y, and Z: Arbitrary positive constants.

When the degree of association calculated by the degree-of-association calculation unit 21 is equal to or more than a threshold value, the response utterance determination unit 22 determines that the N best solutions $B_1$ are N best solutions obtained by the response utterance B in response to the utterance A corresponding to the N best solutions $A_1$. In this case, the threshold value is recorded, in advance, in a memory provided in the response utterance determination unit 22. The threshold value is set by a system administrator of the speech recognition system 1. In this embodiment, it is assumed that the degree of association calculated by the degree-of-association calculation unit 21 is equal to or more than the threshold value. Thus, the response utterance determination unit 22 determines that the N best solutions $B_1$ are N best solutions obtained by the response utterance B in response to the utterance A corresponding to the N best solutions $A_1$.

When the response utterance determination unit 22 determines that the N best solutions $B_1$ are N best solutions obtained by the response utterance B in response to the utterance A corresponding to the N best solutions $A_1$, the repeat utterance determination unit 23 determines whether the N best solutions $B_1$ are N best solutions obtained by a repeat utterance B in response to the utterance A corresponding to the N best solutions $A_1$. Specifically, when the recognition score of the best solution $B_1$ of the N best solutions $B_1$ is equal to or more than a predetermined recognition score and when both (1) and (2) described below are satisfied, the repeat utterance determination unit 23 determines that the N best solutions $B_1$ are N best solutions obtained by a repeat utterance B in response to the utterance A corresponding to the N best solutions $A_1$. In this case, the predetermined recognition score and the preset rank are recorded, in advance, in a memory provided in the repeat utterance determination unit 23. The predetermined recognition score and the preset rank are set by the system administrator of the speech recognition system 1.

(1) A solution in the N best solutions $A_1$ agrees with the best solution $B_1$ of the N best solutions $B_1$.

(2) The recognition score of the aforementioned solution in the N best solutions $A_1$, which agrees with the best solution $B_1$, is equal to or more than a predetermined recognition score, or the aforementioned solution in the N best solutions $A_1$ is placed in a preset rank relative to the best solution $A_1$ or higher, the aforementioned solution agreeing with the best solution $B_1$.

In this embodiment, the recognition score of the best solution $B_1$ "PC" is 0.96. In this embodiment, it is assumed that the recognition score of 0.96 for the best solution $B_1$ "PC" is equal to or more than the predetermined recognition score. Moreover, in this embodiment, the best solution $B_1$ "PC" agrees with a solution "PC" (which ranks second) in the N best solutions $A_1$. That is to say, the aforementioned (1) is satisfied. Moreover, in this embodiment, the recognition score of the solution "PC" in the N best solutions $A_1$ is 0.93, and the solution "PC" in the N best solutions $A_1$ ranks second. In this embodiment, it is assumed that the recognition score of 0.93 for the solution "PC" in the N best solutions $A_1$ is equal to or more than the predetermined recognition score and the second rank is equal to or higher than the preset rank. That is to say, the aforementioned (2) is satisfied. Thus, the repeat utterance determination unit 23 determines that the N best solutions $B_1$ are N best solutions obtained by the repeat utterance B in response to the utterance A corresponding to the N best solutions $A_1$.

In this case, the repeat utterance determination unit 23 preferably refers to the synonym information storage unit 20 when determining whether the N best solutions $B_1$ are N best solutions obtained by the repeat utterance B in response to the utterance A corresponding to the N best solutions $A_1$. In this arrangement, even in a case where corresponding solutions are different from each other, when one of the corresponding solutions agrees with a synonym for the other solution or when synonyms for the corresponding solutions agree with each other, the repeat utterance determination unit 23 can determine that the corresponding solutions agree with each other.

When the repeat utterance determination unit 23 determines that the N best solutions $B_1$ are N best solutions obtained by the repeat utterance B in response to the utterance A corresponding to the N best solutions $A_1$, the agreement determination unit 24 determines whether the best solution $A_1$ and the best solution $B_1$ agree with each other. When the best solution $A_1$ and the best solution $B_1$ do not agree with each other, the agreement determination unit 24 determines that the best solution $A_1$ is incorrect. Specifically, the agreement determination unit 24 determines that some or all of the N best solutions $A_1$ can be replaced with some or all of the N best solutions $B_1$. In this embodiment, since the best solution $A_1$ "CD" and the best solution $B_1$ "PC" do not agree with each other, the agreement determination unit 24 determines that some or all of the N best solutions $A_1$ can be replaced with some or all of the N best solutions $B_1$. The agreement determination unit 24 outputs the result of determination to the recognition result correction unit 25 and the comparison process changing unit 28.

When the agreement determination unit 24 determines that the best solution $A_1$ and the best solution $B_1$ do not agree with each other, the recognition result correction unit 25 updates the best solution $A_1$ in the recognition result storage unit 18, in which the N best solutions $A_1$ are stored, to the best solution $B_1$.

In this embodiment, the recognition result correction unit 25 updates the best solution $A_1$ "CD" in the recognition result storage unit 18, in which the N best solutions $A_1$ are stored, to the best solution $B_1$ "PC". Specifically, the recognition result correction unit 25 assigns a weight to the recognition score of 0.93 for the solution "PC" in the N best solutions $A_1$ so that the recognition score of 0.93 for the solution "PC" in the N best solutions $A_1$ becomes larger than the recognition score of 0.95 for the best solution $A_1$ "CD". For example, the recognition result correction unit 25 adds a weight of 0.05 to the recognition score of 0.93 for the solution "PC" in the N best solutions $A_1$. As a result, the recognition score of the solution "PC" in the N best solutions $A_1$ becomes 0.98. The recognition result correction unit 25 updates the best solution $A_1$ "CD" and the recognition score of 0.95 to the best solution $A_1$ "PC" and the recognition score of 0.98. The recognition result correction unit 25 further reduces "CD", which has been the best solution $A_1$, and the recognition score of 0.95 to the second rank. FIG. 3 shows an example of the structure of data in the recognition result storage unit 18 after the data is updated by the recognition result correction unit 25. The best solution $A_1$ is updated from "CD" to "PC" by the recognition result correction unit 25, as shown in FIG. 3.

In the aforementioned description, a case is described where the recognition result correction unit 25 assigns a weight to the recognition score of 0.93 for the solution "PC" in the N best solutions $A_1$ so that the recognition score of 0.93 for the solution "PC" in the N best solutions $A_1$ becomes larger than the recognition score of 0.95 for the best solution $A_1$ "CD". However, the present invention is not limited to this case. For example, the recognition result correction unit 25 may simply replace the best solution $A_1$ "CD" with the best solution $B_1$ "PC". In this arrangement, the computational cost of the speech recognition system 1 can be reduced much compared with that in a case where weighting is performed.

Moreover, even when the best solution $A_1$ has been updated from "CD" to "PC", the recognition result correction unit 25 may record, in a memory, the solution "PC" and the recognition score of 0.93 as they were before weighting has been performed. This is because the solution and the recognition score as they were before weighting has been performed may be used by the administrator of the speech recognition system 1.

Moreover, the recognition result correction unit 25 may not update the best solution $A_1$ "CD" in the recognition result storage unit 18, in which the N best solutions $A_1$ are stored, to the best solution $B_1$ "PC" and may output the corrected best solution $A_1$ "PC" and the best solution $B_1$ "PC" to the output presentation unit 27.

The output generating unit 26 includes a result output unit 26a and a correction history generating unit 26b.

The result output unit 26a extracts the best solution $A_1$, the best solution $A_2$, and the best solution $B_1$ stored in the recognition result storage unit 18. In this embodiment, the result output unit 26a extracts the best solution $A_1$ "PC", which has been updated by the recognition result correction unit 25, the best solution $A_2$ "Internet", and the best solution $B_1$ "PC". The result output unit 26a outputs, to the output presentation unit 27, the best solution $A_1$ "PC", the best solution $A_2$ "Internet", and the best solution $B_1$ "PC", which have been extracted.

The correction history generating unit 26b generates history data representing a history of updates applied by the recognition result correction unit 25. In this embodiment, the best solution $A_1$ is updated from "CD" to "PC" by the recognition result correction unit 25. Thus, the correction history generating unit 26b generates history data representing a history showing that the best solution $A_1$ has been updated from "CD" to "PC". The correction history generating unit 26b outputs the generated history data to the output presentation unit 27.

Figure 4:
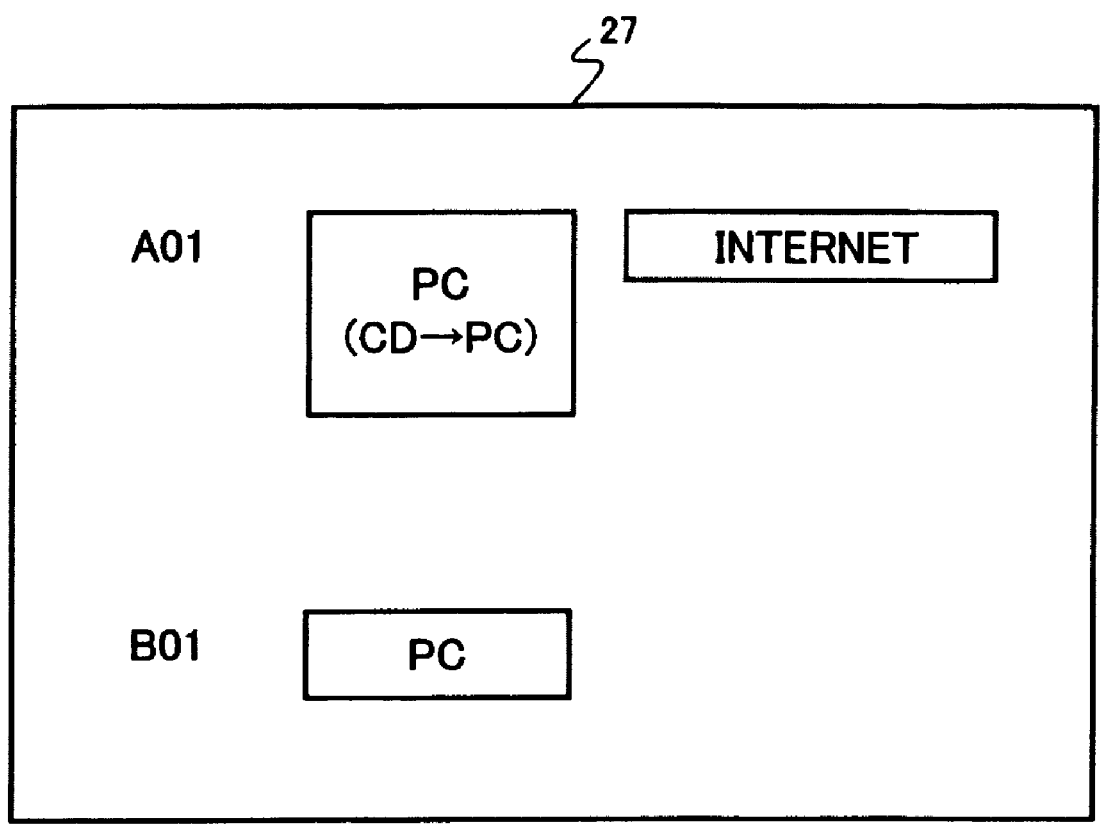
FIG. 4 is a schematic diagram showing an example of a display screen presented on an output presentation unit in the speech recognition system.

The output presentation unit 27 presents, to the speaker b (the operator), the best solution $A_1$ "PC", the best solution $A_2$ "Internet", the best solution $B_1$ "PC", and the history data output from the output generating unit 26. FIG. 4 is a schematic diagram showing an example of a display screen presented (displayed) on the output presentation unit 27. Utterance Number A01 unique to the utterance A, the best solution $A_1$ "PC", the best solution $A_2$ "Internet", Utterance Number B01 unique to the utterance B, and the best solution $B_1$ "PC" are displayed on the output presentation unit 27, as shown in FIG. 4. Moreover, "CD→PC" representing the history showing that the best solution $A_1$ has been corrected from "CD" to "PC" is displayed on the output presentation unit 27. Thus, the speaker b can check a history of corrections of the results of erroneous recognition. In this case, the output presentation unit 27 may make it easy for the speaker b to see the history by flashing or highlighting the display of "CD→PC" representing the history. The output presentation unit 27 includes, for example, a liquid crystal display, an organic EL display, a plasma display, a CRT display, a speaker, or a speech synthesizer.

In this case, a function (an undo function) of restoring the best solution $A_1$, which has been updated by the recognition result correction unit 25 from "CD" to "PC", to its original state by operation of input means (not shown) by the speaker b may be provided. Specifically, the best solution $A_1$ is restored from "PC" after the update to "CD" before the update by operation of the input means (not shown) by the speaker b after the speaker b issues an instruction to perform the undo function. The display of "CD→PC" is changed to the display of "CD" on the output presentation unit 27 by this operation.

When the agreement determination unit 24 determines that the best solution $A_1$ and the best solution $B_1$ agree with each other, the comparison process changing unit 28 changes the comparison method used by the comparison unit 16 on the basis of the co-occurrence information and/or the semantic attribute. When the best solution $A_1$ and the best solution $B_1$ agree with each other, the reliability of the solutions is high. In this case, co-occurrence information is information representing co-occurrence relationships between recognition vocabularies. Co-occurrence relationships represent groups of recognition vocabularies that are likely to concurrently occur in sentences and relationships between the recognition vocabularies. A semantic attribute is an attribute representing the meaning of a recognition vocabulary. Co-occurrence information is stored in the co-occurrence information storage unit 29 in advance. Semantic attributes are stored in the semantic attribute storage unit 30 in advance.

In this embodiment, the best solution $A_1$ "CD" and the best solution $B_1$ "PC" do not agree with each other (see FIG. 2). Thus, in this embodiment, the comparison process changing unit 28 does not perform the aforementioned process. In this embodiment, if the best solution $A_1$ were "PC", the best solution $A_1$ "PC" and the best solution $B_1$ "PC" would agree with each other. In such a case, the comparison process changing unit 28 changes the comparison method used by the comparison unit 16 on the basis of the co-occurrence information and/or the semantic attribute.

In an example, the comparison process changing unit 28 changes the comparison method used by the comparison unit 16 on the basis of the semantic attribute so that the recognition scores of recognition vocabularies having meanings related to "PC" that is the best solution $A_1$ and the best solution $B_1$ are higher than the recognition scores of recognition vocabularies other than these recognition vocabularies. In this case, it is assumed that the recognition vocabularies having meanings related to "PC" are recognition vocabularies related to computer terms. Specifically, the comparison process changing unit 28 sends the comparison unit 16 an instruction to, for example, assign a predetermined recognition score to recognition vocabularies related to computer terms so that the recognition scores of the recognition vocabularies related to computer terms are higher than the recognition scores of recognition vocabularies other than computer terms. That is to say, in a dialog between the speaker a and the speaker b, when the best solution $A_1$ and the best solution $B_1$ are "PC", it can be determined that the reliability of the result of recognition is very high. Thus, it can be determined that the content of the dialog is also related to computers. Moreover, the probability that the content of subsequent utterances is related to computers is high. Thus, when the comparison process changing unit 28 sends the comparison unit 16 an instruction to assign the predetermined recognition score to the recognition vocabularies related to computer terms, the accuracy rate of recognition by the comparison unit 16 can be improved.

Moreover, in another example, the comparison process changing unit 28 changes the comparison method used by the comparison unit 16 on the basis of the semantic attribute so that recognition vocabularies having meanings related to "PC" that is the best solution $A_1$ and the best solution $B_1$ are set as recognition vocabularies that are subjected to comparison and the other recognition vocabularies are set as recognition vocabularies that are not subjected to comparison. Specifically, the comparison process changing unit 28 sends the comparison unit 16 an instruction to set recognition vocabularies related to computer terms as recognition vocabularies that are subjected to comparison and set the other recognition vocabularies as recognition vocabularies that are not subjected to comparison. That is to say, in a dialog between the speaker a and the speaker b, when the best solution $A_1$ and the best solution $B_1$ are "PC", it can be determined that the reliability of the result of recognition is very high. Thus, it can be determined that the content of the dialog is also related to computers. Moreover, the probability that the content of subsequent utterances is related to computers is high. Thus, when the comparison process changing unit 28 sends the comparison unit 16 an instruction to set the recognition vocabularies related to computer terms as recognition vocabularies that are subjected to comparison and set the other recognition vocabularies as recognition vocabularies that are not subjected to comparison, the accuracy rate of recognition by the comparison unit 16 can be improved.

In this case, the speaker b may undo the change, made by the comparison process changing unit 28, of the comparison method used by the comparison unit 16 by operating the input means (not shown) after issuing an instruction to perform the undo function.

The aforementioned speech recognition system 1 may be also implemented by installing a program in any computer, for example, a personal computer. That is to say, the speech input unit 11, the input identification unit 12, the acoustic processing unit 13, the comparison unit 16, the time information control unit 17, the recognition result extraction unit 19, the degree-of-association calculation unit 21, the response utterance determination unit 22, the repeat utterance determination unit 23, the agreement determination unit 24, the recognition result correction unit 25, the output generating unit 26, the output presentation unit 27, and the comparison process changing unit 28, described above, are implemented by operation of a CPU in a computer according to a program that performs functions of these components. Thus, an embodiment of the present invention includes the program or a recording medium in which the program is recorded. The program performs the functions of the speech input unit 11, the input identification unit 12, the acoustic processing unit 13, the comparison unit 16, the time information control unit 17, the recognition result extraction unit 19, the degree-of-association calculation unit 21, the response utterance determination unit 22, the repeat utterance determination unit 23, the agreement determination unit 24, the recognition result correction unit 25, the output generating unit 26, the output presentation unit 27, and the comparison process changing unit 28. Moreover, the acoustic model storage unit 14, the language model storage unit 15, the recognition result storage unit 18, the synonym information storage unit 20, the co-occurrence information storage unit 29, and the semantic attribute storage unit 30 are implemented via a storage unit included in a computer or a storage unit accessible from the computer.

In the aforementioned speech recognition system 1, an arrangement in which the speaker b can issue an instruction to enable or disable the functions of the recognition result correction unit 25 and the comparison process changing unit 28 by operating the input means (not shown) may be adopted.

[Operation of Speech Recognition System]

A process in the speech recognition system 1 related to the aforementioned structure will now be described with reference to FIG. 5.

Figure 5:
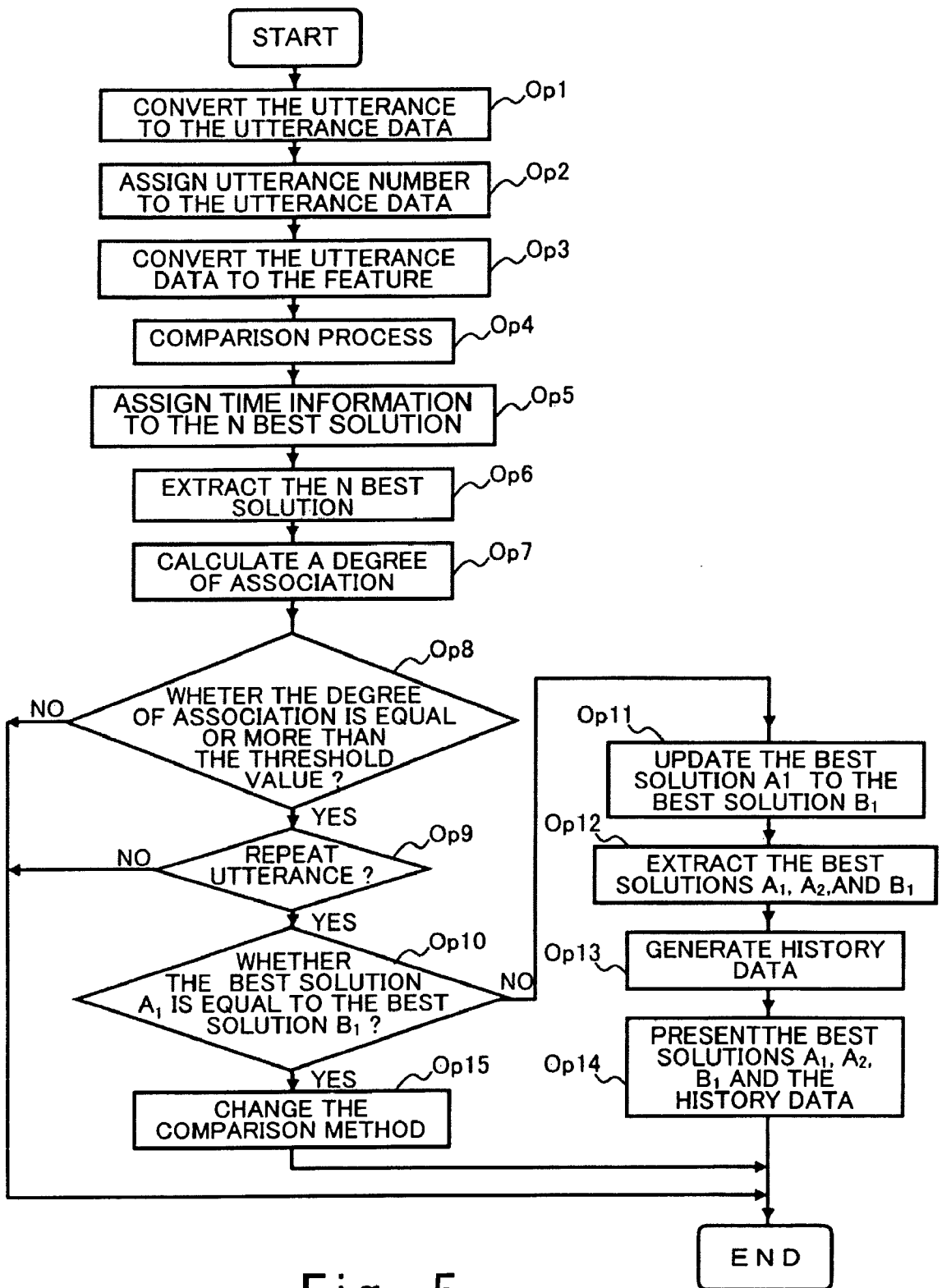
FIG. 5 is a flowchart showing an example of the operation of the speech recognition system.

FIG. 5 is a flowchart showing the outline of the process in the speech recognition system 1. When the speech input unit 11 has accepted a dialog between the two speakers, i.e., the speaker a and the speaker b, the speech input unit 11 converts the utterance A made by the speaker a to the utterance data A and the utterance B made by the speaker b to the utterance data B, as shown in FIG. 5 (operation Op1). The input identification unit 12 assigns Utterance Number A01 to the utterance data A obtained by the conversion in operation Op1 and Utterance Number B01 to the utterance data B obtained by the conversion in operation Op1 (operation Op2). The acoustic processing unit 13 converts the utterance data A output from the input identification unit 12 to the features A and converts the utterance data B output from the input identification unit 12 to the features B (operation Op3).

Then, the comparison unit 16 performs the aforementioned comparison process (operation Op4). Specifically, the comparison unit 16 calculates recognition scores on the basis of the utterance A and the plurality of recognition vocabularies stored in the language model storage unit 15, using the features A obtained by the conversion in operation Op3. As the result of calculation of recognition scores, assuming that a recognition vocabulary having the highest recognition score is the best solution A, the comparison unit 16 outputs top N (N is an integer equal to or more than one) recognition vocabularies having high recognition scores, starting from the best solution A, as the N best solutions A. Moreover, the comparison unit 16 calculates recognition scores on the basis of the utterance B and the plurality of recognition vocabularies stored in the language model storage unit 15, using the features B obtained by the conversion in operation Op3. As the result of calculation of recognition scores, assuming that a recognition vocabulary having the highest recognition score is the best solution B, the comparison unit 16 outputs top N (N is an integer equal to or more than one) recognition vocabularies having high recognition scores, starting from the best solution B, as the N best solutions B.

The time information control unit 17 assigns time information representing the current time to the N best solutions A output in operation Op4 and assigns time information representing the current time to the N best solutions B output in operation Op4 (operation Op5). The N best solutions A and the N best solutions B, to which the time information has been assigned in operation Op5, are stored in the recognition result storage unit 18, as shown in FIG. 2.

Then, the recognition result extraction unit 19 extracts, from the recognition result storage unit 18, the N best solutions A and the N best solutions B obtained by the utterance B. The utterance B chronologically follows the utterance A corresponding to the N best solutions A and has been made by the speaker b who is different from the speaker of the utterance A corresponding to the N best solutions A. In this case, it is assumed that the recognition result extraction unit 19 extracts, from the recognition result storage unit 18 (see FIG. 2), the N best solutions $A_1$ corresponding to the utterance section for "PC" and the N best solutions $B_1$ corresponding to the utterance section for "PC".

The degree-of-association calculation unit 21 calculates a degree of association representing a likelihood that the N best solutions $B_1$ extracted in operation Op6 are N best solutions obtained by the response utterance B in response to the utterance A corresponding to the N best solutions $A_1$ (operation Op7). In this case, the degree-of-association calculation unit 21 calculates the degree of association using the aforementioned method. When the degree of association calculated in operation Op7 is equal to or more than the threshold value (YES in operation Op8), the response utterance determination unit 22 determines that the N best solutions $B_1$ extracted in operation Op6 are N best solutions obtained by the response utterance B in response to the utterance A corresponding to the N best solutions $A_1$. Then, the process proceeds to operation Op9. On the other hand, when the degree of association calculated in operation Op7 is less than the threshold value (NO in operation Op8), the response utterance determination unit 22 determines that the N best solutions $B_1$ extracted in operation Op6 are not N best solutions obtained by the response utterance B in response to the utterance A corresponding to the N best solutions $A_1$. Then, the process in FIG. 5 is completed.

When the repeat utterance determination unit 23 determines that the N best solutions $B_1$ are N best solutions obtained by the repeat utterance B in response to the utterance A corresponding to the N best solutions $A_1$ (YES in operation Op9), the process proceeds to operation Op10. On the other hand, when the repeat utterance determination unit 23 determines that the N best solutions $B_1$ are not N best solutions obtained by the repeat utterance B in response to the utterance A corresponding to the N best solutions $A_1$ (NO in operation Op9), the process in FIG. 5 is completed.

The agreement determination unit 24 determines whether the best solution $A_1$ in the N best solutions $A_1$ and the best solution $B_1$ in the N best solutions $B_1$ agree with each other. When the agreement determination unit 24 determines that the best solution $A_1$ and the best solution $B_1$ do not agree with each other (NO in operation Op10), the agreement determination unit 24 determines that some or all of the N best solutions $A_1$ can be replaced with some or all of the N best solutions $B_1$. Then, the process proceeds to operation Op11.

The recognition result correction unit 25 updates the best solution $A_1$ in the recognition result storage unit 18, in which the N best solutions $A_1$ are stored, to the best solution $B_1$ (operation Op11). The result output unit 26a extracts the best solution $A_1$, the best solution $A_2$, and the best solution $B_1$ stored in the recognition result storage unit 18 (operation Op12). The correction history generating unit 26b generates history data representing a history of updates applied in operation Op11 (operation Op13). The output presentation unit 27 presents the best solution $A_1$, the best solution $A_2$, and the best solution $B_1$ extracted in operation Op12 and the history data generated in operation Op13 (operation Op14).

On the other hand, when the agreement determination unit 24 determines that the best solution $A_1$ and the best solution $B_1$ agree with each other (YES in operation Op10), the comparison process changing unit 28 changes the comparison method used by the comparison unit 16 on the basis of the co-occurrence information and/or the semantic attribute (operation Op15).

As described above, in the speech recognition system 1 according to this embodiment, when the repeat utterance determination unit 23 determines that the N best solutions $B_1$ are N best solutions obtained by the repeat utterance B in response to the utterance A corresponding to the N best solutions $A_1$, the agreement determination unit 24 determines whether the best solution $A_1$ and the best solution $B_1$ agree with each other. When the best solution $A_1$ and the best solution $B_1$ do not agree with each other, the agreement determination unit 24 determines that the best solution $A_1$ is incorrect. In general, operators are constantly trained so that they speak clearly compared with users. Moreover, operators can intentionally speak so that a correct result of recognition can be obtained. Moreover, in a case where the speech recognition system 1 is provided in a call center, utterances made by users are recognized via telephone lines, and utterances made by operators are recognized not via telephone lines, information of utterances made by users may be deteriorated much compared with information of utterances made by operators due to the intrusion of noise in telephone lines or the intervention of various types of filter. Because of such a reason, the agreement determination unit 24 according to the present invention determines that some or all of the N best solutions A can be replaced with some or all of the N best solutions B. Thus, in a dialog between a user and an operator, when the user's utterance is erroneously recognized, the result of erroneous recognition can be corrected without the user being conscious of the action, without operation of input means such as a keyboard by the operator, and without interrupting the dialog.

The aforementioned specific examples are merely preferred embodiments of the speech recognition system 1 according to the present invention. Various changes can be made for, for example, the process of calculation of a degree of association by the degree-of-association calculation unit and the content presented on the output presentation unit.

[First Modification of Process of Calculation of Degree of Association by Degree-of-Association Calculation Unit]

A first modification of the process of calculation of a degree of association by the degree-of-association calculation unit 21 in operation Op7 shown in FIG. 5 will now be described as an example. Specifically, the degree-of-association calculation unit 21 calculates a degree of association on the basis of the time difference between the N best solutions A and the N best solutions B. In the first modification, the degree-of-association calculation unit 21 calculates a degree of association on the basis of the time difference "5" between the current time "10:00:00" represented by the time information assigned to the N best solutions $A_1$ and the current time "10:00:05" represented by the time information assigned to the N best solutions $B_1$. Specifically, in the first modification, the degree-of-association calculation unit 21 calculates a degree of association using Equation 2 described below. In Equation 2 described below, X represents a predetermined positive constant. Moreover, | | represents an absolute value.

Degree of Association=$X$/|Time Difference between Current Time Represented by Time Information Assigned to $N$ Best Solutions $A_1$ and Current Time Represented by Time Information Assigned to $N$ Best Solutions $B_1$| [Equation 2]

In the first modification, the degree of association is X/5 according to Equation 2 described above. That is to say, Equation 2 described above is an equation in which, the smaller the aforementioned time difference, the higher the degree of association. On the other hand, conversely, Equation 2 described above is an equation in which, the larger the aforementioned time difference, the lower the degree of association.

[Second Modification of Process of Calculation of Degree of Association by Degree-of-Association Calculation Unit]

A second modification of the process of calculation of a degree of association by the degree-of-association calculation unit 21 in operation Op7 shown in FIG. 5 will now be described as another example. Specifically, the degree-of-association calculation unit 21 sets, as the first N best solutions A, a chronologically first group of the N best solutions A out of groups of the N best solutions A individually corresponding to the P utterance sections. The degree-of-association calculation unit 21 further sets, as the first N best solutions B, a chronologically first group of the N best solutions B out of groups of the N best solutions B individually corresponding to the Q utterance sections. In this case, the first N best solutions A are the N best solutions $A_1$. Moreover, the first N best solutions B are the N best solutions $B_1$. The degree-of-association calculation unit 21 calculates a degree of association on the basis of the difference between the position at which one group of the N best solutions B out of the groups of the N best solutions B individually corresponding to the Q utterance sections appear relative to the first N best solutions B and the position at which one group of the N best solutions A corresponding to the one group of the N best solutions B appear relative to the first N best solutions A. In this case, the degree-of-association calculation unit 21 determines using Equation 1 or Equation 2 described above whether a group of the N best solutions A corresponds to a group of the N best solutions B. In the second modification, the degree-of-association calculation unit 21 calculates a degree of association on the basis of the difference of zero between the position at which the first N best solutions $B_1$ appear and the position at which the first N best solutions $A_1$ corresponding to the first N best solutions $B_1$ appear. Specifically, in the second modification, the degree-of-association calculation unit 21 calculates a degree of association using Equation 3 described below. In Equation 3 described below, X and Y represent predetermined positive constants. Moreover, | | represents an absolute value.

Degree of Association=$X$–$Y$×(|Difference between Position at which $N$ Best Solutions $B_1$ Appear and Position at which $N$ Best Solutions $A_1$ Appear|) [Equation 3]

In the second modification, the degree of association is X according to Equation 3 described above. That is to say, Equation 3 described above is an equation in which, the smaller the difference between the aforementioned positions, the higher the degree of association. On the other hand, conversely, Equation 3 described above is an equation in which, the larger the difference between the aforementioned positions, the lower the degree of association.

[Third Modification of Process of Calculation of Degree of Association by Degree-of-Association Calculation Unit]

Figure 6:
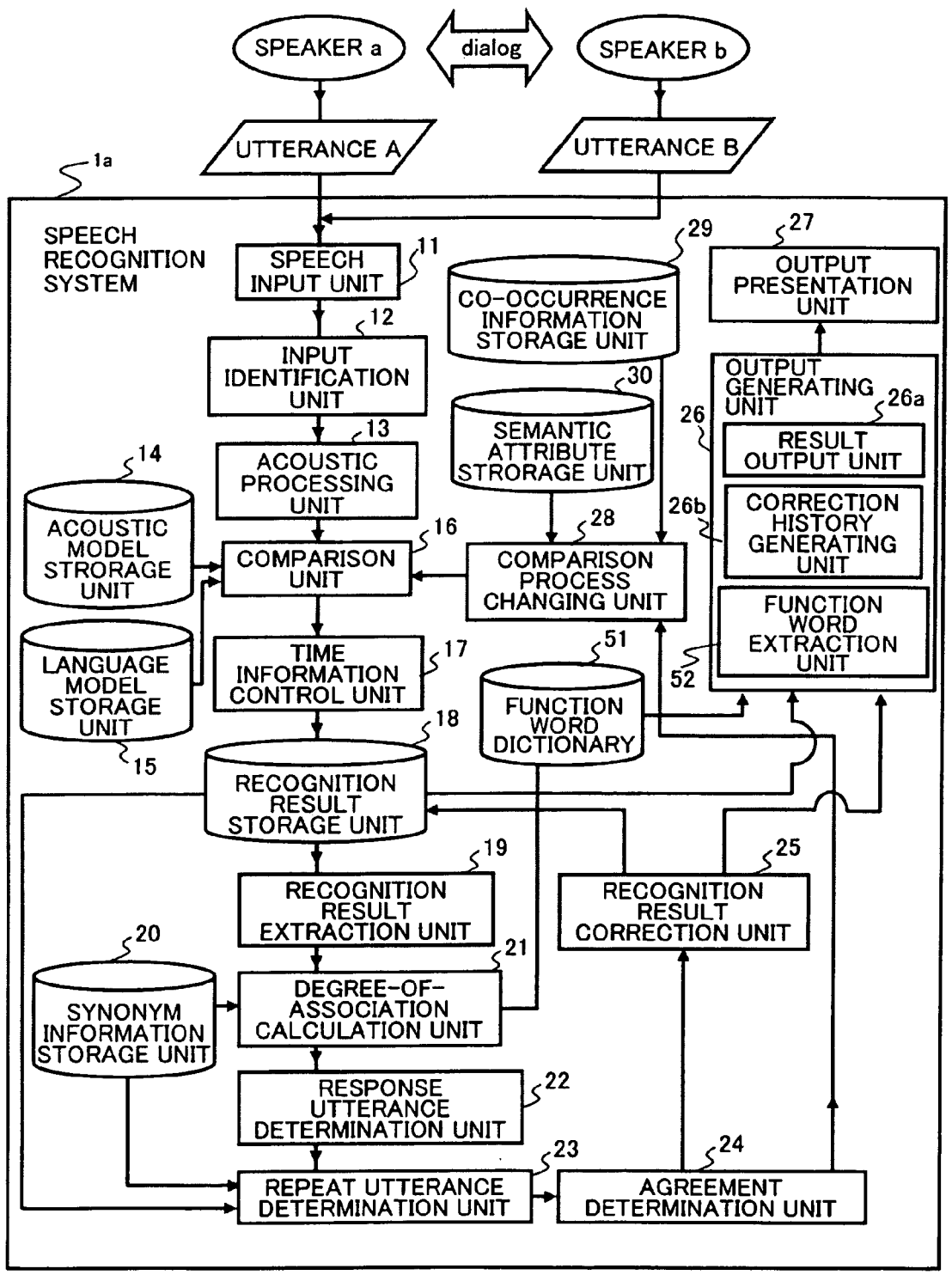
FIG. 6 is a block diagram showing the outline structure of a speech recognition system according to a third modification of the present invention.

A third modification of the process of calculation of a degree of association by the degree-of-association calculation unit 21 in operation Op7 shown in FIG. 5 will now be described as yet another example. FIG. 6 is a block diagram showing the outline structure of a speech recognition system 1a according to the third modification. That is to say, the speech recognition system 1a according to the third modification includes a function word dictionary 51 in addition to the speech recognition system 1 shown in FIG. 1. The speech recognition system 1a according to the third modification further includes a function word extraction unit 52 in the output generating unit 26 shown in FIG. 1. In FIG. 6, the same reference numerals as in FIG. 1 are assigned to components having the same functions as those in FIG. 1, and the detailed description is omitted here.

The function word dictionary 51 stores function words representing the positions at which utterances appear in association with the positions. FIG. 7 shows an example of the structure of data in the function word dictionary 51. Specifically, the function word dictionary 51 stores function words representing the positions at which utterances appear and the positions as a function word table 51a. In the example shown in FIG. 7, the function word table 51a stores the following function words representing the positions at which utterances appear: "Ichi-banme" (a Japanese word meaning "first"), "Ni-banme" (a Japanese word meaning "second"), . . . , "N-banme" (a Japanese word meaning "N-th"), "Mazu" (a Japanese word meaning "first"), "Tsugi" (a Japanese word meaning "next"), . . . , "Owarini" (a Japanese word meaning "finally"), "Hajimeni" (a Japanese word meaning "first"), . . . , and "Saigoni" (a Japanese word meaning "finally"). Moreover, in the function word table 51a, the positions represented by these function words are stored in association with these function words. In this case, the function words and the positions stored in the function word dictionary 51 are set by an administrator of the speech recognition system 1a in advance.

Moreover, it is assumed that the comparison unit 16 in the third modification extracts two utterance sections for "Mazu" and "PC" from the features B representing "Mazu PC Nitsuite Desuga.". Specifically, the comparison unit 16 extracts sequences of phonemes (sequences of symbols) for "Mazu" and "PC" by comparing the extracted utterance sections for "Mazu" and "PC" with the data stored in the acoustic model storage unit 14. The comparison unit 16 outputs the N best solutions B corresponding to each of the two utterance sections for "Mazu" and "PC" by comparing the extracted sequences of phonemes for "Mazu" and "PC" with the plurality of recognition vocabularies stored in the language model storage unit 15.

Thus, instead of the recognition result storage table 18a shown in FIG. 2, a recognition result storage table 18b is stored in the recognition result storage unit 18 in the third modification, as shown in FIG. 8. Specifically, in the recognition result storage table 18b, in addition to the recognition result storage table 18a, the N best solutions $B_1$ corresponding to the utterance section for "Mazu" is associated with Utterance Number B01. Recognition scores of 0.90, 0.65, . . . are associated with the N best solutions $B_1$ "Mazu", "map", . . . , respectively. Moreover, time "10:00:05" (ten hours, zero minutes, and five seconds) assigned by the time information control unit 17 is associated with the N best solutions $B_1$.

When the best solution B in any one group of the N best solutions B out of the groups of the N best solutions B individually corresponding to the Q utterance sections agrees with a function word stored in the function word dictionary 51, the degree-of-association calculation unit 21 sets the position represented by this function word as the position at which a group of the N best solutions B appear, the group of the N best solutions B being chronologically next to the one group of the N best solutions B including the best solution B, which agrees with this function word. In the third modification, the degree-of-association calculation unit 21 determines whether the best solution $B_1$ "Mazu" and the best solution $B_2$ "PC" agree with function words. In this case, the best solution $B_1$ "Mazu" agrees with the function word "Mazu". Thus, the degree-of-association calculation unit 21 sets the position of 1 represented by the function word "Mazu" as the position at which the N best solutions $B_2$ appear, the N best solutions $B_2$ being chronologically next to the N best solutions $B_1$ including the best solution $B_1$ "Mazu". That is to say, the N best solutions $B_2$ becomes the first N best solutions $B_2$ instead of the second N best solutions $B_2$.

The degree-of-association calculation unit 21 calculates a degree of association on the basis of the difference between the position at which one group of the N best solutions B out of the groups of the N best solutions B individually corresponding to the Q utterance sections appear relative to the first N best solutions B and the position at which one group of the N best solutions A corresponding to the one group of the N best solutions B appear relative to the first N best solutions A, as in the second modification. In the third modification, the degree-of-association calculation unit 21 calculates a degree of association on the basis of the difference of zero between the position at which the first N best solutions $B_2$ appear and the position at which the first N best solutions $A_1$ corresponding to the first N best solutions $B_2$ appear. In this case, an equation for calculating a degree of association is similar to Equation 3 described above. In this arrangement, for example, even in a case where, before the speaker b speaks "PC", the speaker b has made another utterance, when the speaker b speaks "PC" immediately after speaking the function word "Mazu", the position at which the N best solutions $B_2$ corresponding to the utterance section for "PC" appear and the position at which the N best solutions $A_1$ corresponding to the utterance section for "PC" appear are the same (first). Thus, the degree-of-association calculation unit 21 can calculate the maximum degree of association using Equation 3 described above. As a result, a degree of association can be calculated more accurately than in the second modification, in which a degree of association is calculated simply on the basis of the difference between the positions on the time series.

The function word extraction unit 52 extracts, from the function word dictionary 51, function words corresponding to the positions, on the time series, at which the groups of the N best solutions A individually corresponding to the P utterance sections appear. After the speaker a makes the utterance A "PC Nitsuite Oshiete. Ato Internet Mo.", the N best solutions $A_1$ and the N best solutions $A_2$ are stored in the recognition result storage unit 18 as a recognition result storage table 18c, as shown in FIG. 9. In this case, the function word extraction unit 52 extracts, from the function word dictionary 51, function words corresponding to the positions of 1 and 2, on the time series, at which groups of the N best solutions A individually corresponding to the two utterance sections appear. Specifically, the function word extraction unit 52 extracts, from the function word dictionary 51, the function words "Ichi-banme", "Mazu", and "Hajimeni" corresponding to the position of 1. The function word extraction unit 52 further extracts, from the function word dictionary 51, the function words "Ni-banme" and "Tsugi" corresponding to the position of 2. The function word extraction unit 52 outputs the extracted function words to the output presentation unit 27.

The output presentation unit 27 presents the function words extracted by the function word extraction unit 52 in association with the individual best solutions A of the groups of the N best solutions A individually corresponding to the P utterance sections. In the third modification, the output presentation unit 27 presents the function words extracted by the function word extraction unit 52 in association with the best solution $A_1$ "CD" and the best solution $A_2$ "Internet". FIG. 10 is a schematic diagram showing an example of a display screen presented (displayed) on the output presentation unit 27. The function words "Ichi-banme/Mazu/Hajimeni" are displayed in association with the best solution $A_1$ "CD" on the output presentation unit 27, as shown in FIG. 10. Moreover, the function words "Ni-banme/Tsugi" are displayed in association with the best solution $A_2$ "Internet" on the output presentation unit 27. Thus, the speaker b finds that, although the speaker a has spoken "PC", the result (the best solution $A_1$) of recognition is "CD", which is incorrect. Then, for example, the speaker b repeatedly speaks a result of correct recognition, i.e., "PC", immediately after speaking any one of the function words "Ichi-banme/Mazu/Hajimeni" displayed in association with the best solution $A_1$ "CD" so as to correct the result of erroneous recognition. Specifically, in the third modification, the speaker b makes the utterance B "Mazu PC Nitsuite Desuga.". Thus, as described above, the degree-of-association calculation unit 21 can calculate the maximum degree of association using Equation 3 described above. As a result, the response utterance determination unit 22 can reliably determine that the N best solutions B are N best solutions obtained by the response utterance B in response to the utterance A corresponding to the N best solutions A.

[Fourth Modification of Process of Calculation of Degree of Association by Degree-of-Association Calculation Unit]

Moreover, a fourth modification of the process of calculation of a degree of association by the degree-of-association calculation unit 21 in operation Op7 shown in FIG. 5 will now be described as yet another example. It is first assumed that a degree of association calculated by the degree-of-association calculation unit 21 described in the present embodiment is a first degree of association, a degree of association calculated by the degree-of-association calculation unit 21 described in the first modification is a second degree of association, a degree of association calculated by the degree-of-association calculation unit 21 described in the second modification is a third degree of association, and a degree of association calculated by the degree-of-association calculation unit 21 described in the third modification is a fourth degree of association. In this case, the degree-of-association calculation unit 21 calculates a degree of association on the basis of all of the first to fourth degrees of association or a combination of ones of the first to fourth degrees of association. For example, the degree-of-association calculation unit 21 calculates a degree of association by calculating the sum or product of the first to fourth degrees of association. Since a degree of association is calculated on the basis of a combination of a plurality of degrees of association, a degree of association that is more accurate than in the aforementioned embodiment and the first to third modifications can be calculated.

In the aforementioned description, a case is described where the degree-of-association calculation unit 21 calculates a degree of association on the basis of all of the first to fourth degrees of association or a combination of ones of the first to fourth degrees of association. However, the present invention is not limited to this case. For example, the degree-of-association calculation unit 21 may calculate a degree of association after assigning different weights or applying different correction values to the first to fourth degrees of association.

Moreover, a degree-of-association calculation method changing unit that changes the method for calculating a degree of association may be provided. For example, the degree-of-association calculation method changing unit performs switching between a method in which the degree-of-association calculation unit 21 calculates a degree of association on the basis of the first and second degrees of association and another method in which the degree-of-association calculation unit 21 calculates a degree of association on the basis of the third and fourth degrees of association. Thus, the degree-of-association calculation method changing unit can change the method for calculating a degree of association according to the convenience of the speech recognition system.

Moreover, the degree-of-association calculation unit 21 may calculate the similarity between the speech waveform of the utterance A accepted by the speech input unit 11 and the speech waveform of the utterance B accepted by the speech input unit 11, using, for example, DP matching, and calculate a degree of association on the basis of the similarity. Moreover, the degree-of-association calculation unit 21 may calculate the similarity between the features A obtained by conversion by the acoustic processing unit 13 and the features B obtained by conversion by the acoustic processing unit 13; using, for example, DP matching, and calculate a degree of association on the basis of the similarity. That is to say, the degree-of-association calculation unit 21 can use any method as long as a degree of association representing a likelihood that the N best solutions B are N best solutions obtained by the response utterance B in response to the utterance A corresponding to the N best solutions A can be calculated.

Moreover, in the aforementioned description, a case is described where the repeat utterance determination unit 23 determines whether the N best solutions $B_1$ are N best solutions obtained by the repeat utterance B in response to the utterance A corresponding to the N best solutions $A_1$. However, the present invention is not limited to this case. That is to say, when the N best solutions B are N best solutions obtained by an utterance that chronologically follows the utterance A corresponding to the N best solutions A and has been made by a speaker who is different from a speaker of the utterance A corresponding to the N best solutions A, the repeat utterance determination unit 23 can perform the determination process.

That is to say, the present invention is not limited to the aforementioned embodiment and the first to fourth modifications, and various changes can be made within the scope described in the claims. Thus, an embodiment obtained by combining technical means that are appropriately changed within the scope described in the claims is also covered by the technical scope of the present invention.

Moreover, the following appendices are disclosed regarding the aforementioned embodiment.

As described above, in the speech recognition system and the speech recognition program of the present invention, an advantage can be achieved in that, in a dialog between at least two speakers, when an utterance of one speaker is erroneously recognized, the result of erroneous recognition can be corrected without the one speaker being conscious of the action, without operation of input means such as a keyboard by the other speaker, and without interrupting the dialog.

What is claimed is:

1. A speech recognition system comprising:
an identifier for adding an identifying code to utterance data corresponding to signals generated by utterances of each of a plurality of users, the identifying code being available for identifying each of the users,
a calculator for rating the utterance data by a value for each of the identifying code, the value being determined on the basis of comparison of characteristics of the utterance data with characteristics of word information selected from a plurality of sets of word information stored;
storage for storing N pieces of vocabulary information corresponding to N sets of the utterance data, the utterance data having a same identifying code, the N sets of utterance data having the value within top N, N being an integer equal to one or more;

a selector for selecting posterior N pieces of word information posterior in time to prior N pieces of word information, the identifying codes of the utterance data relative to the posterior and prior N pieces of word information being spoken by the users that are different from each other;

a relational calculator for calculating a degree of relationship between the prior and posterior N pieces of word information, the degree of relationship being capable of rating a fact of the utterance relative to the posterior N pieces of word information being performed later than the utterance relative to the prior N pieces of word information;

a first determiner for determining the posterior N pieces of word information corresponding to an utterance performed later than the utterance relative to the prior N pieces of word information; and a second determiner for determining the posterior N pieces of word relative to an utterance as a response to the utterance relating to the prior N pieces of word information on the basis of a predetermined condition.

2. A speech recognition system according to claim 1, further comprising:
a third determiner for determining whether a first prior word information of the prior N pieces of word information agrees with a first posterior word of the posterior N pieces of word information, the first prior word information corresponding to the utterance data having a highest value within data relative to the prior N pieces of word information, the first posterior word information corresponding to the utterance data having a highest value within data relative to the posterior N pieces of word information.

3. A speech recognition system according to claim 2, further comprising:
a replacer for replacing the first prior word information of the prior N pieces of word information with the first posterior word of the posterior N pieces of word information in the case that the first prior and posterior vocabularies information disagree.

4. A speech recognition system comprising:
an input identification means for identifying each of a plurality of users of received signals of utterance;
recognition result storage for storing top N recognition vocabularies having high recognition scores starting from the best solution as N best solutions, N being an integer equal to one or more, the recognition scores being calculated by comparing data corresponding to the utterance with a plurality of recognition vocabularies, a recognition word having the highest recognition score being the best solution;
a recognition result extraction means for extracting N best solutions extracted as following N best solutions from the recognition result storage, the following N best solutions following chronologically the utterance corresponding to a preceding N best solutions, the following N best solutions having been made by one of the users different from the user of the utterance corresponding to the preceding N best solutions;
a degree of association calculation means for calculating a degree of association representing a likelihood that the following N best solutions are N best solutions obtained by a response utterance in response to the utterance corresponding to the preceding N best solutions;

a response utterance determination means for determining that the following N best solutions are N best solutions obtained by a response utterance in response to the utterance corresponding to the preceding N best solutions in the case of the degree of association being equal to or more than a threshold value;

a repeat utterance determination means for determining whether the following N best solutions are N best solutions obtained by a repeat utterance in response to the utterance corresponding to the preceding N best solution, in the case that the following N best solutions are N best solutions obtained by a response utterance in response to the utterance corresponding to the preceding N best solutions; and an agreement determination means for: determining whether a preceding best solution and a following best solution agree with each other in the case of the following N best solutions being best solutions obtained by a repeat utterance in response to the utterance corresponding to the preceding N best solutions, the preceding best solution being a best solution of the preceding N best solutions, the following best solution being a best solution of the following N best solutions is the following best solution; and determining that some or all of the preceding N best solutions can be replaced with some or all of the following N best solutions in the case that the preceding best solution and the following best solution do not agree with each other.

5. The speech recognition system according to claim 4, further comprising:
a recognition result correction means for updating the preceding best solution in the recognition result storage to the following best solution, the recognition storage storing the preceding N best solutions, in the case that the agreement determination means determines that the preceding best solution and the following best solution do not agree with each other; and
a result output means for outputting the following best solution updated by the recognition result correction means.

6. The speech recognition system according to claim 5, further comprising:
a correction history generating means for generating history data representing a history of updates applied by the recognition result correction means; and
an output presentation means for presenting the history data generated by the correction history generating means.

7. The speech recognition system according to claim 4, wherein, in the case where the response utterance determination means determines that the following N best solutions are N best solutions obtained by a response utterance in response to the utterance corresponding to the preceding N best solutions, when the recognition score of the following best solution of the following N best solutions is equal to or more than a predetermined recognition score and when both a first and second conditions are satisfied, the repeat utterance determination means determines that the following N best solutions are N best solutions obtained by a repeat utterance in response to the utterance corresponding to the preceding N best solutions, the first condition being that a solution in the preceding N best solutions agrees with the following best solution of the following N best solutions, the second condition being that the recognition score of the aforementioned solution in the preceding N best solutions, which agrees with the following best solution, is equal to or more than a predetermined recognition score, or the aforementioned solution in the preceding N best solutions is placed in a preset rank relative to the preceding best solution or higher, the aforementioned solution agreeing with the following best solution.

8. The speech recognition system according to claim 4, the system further comprising:
   a co-occurrence information storage that stores co-occurrence information representing co-occurrence relationships between recognition vocabularies and/or a semantic attribute storage that stores semantic attributes representing the meanings of recognition vocabularies, and
   a comparison process changing means for changing a method for comparing an utterance with a plurality of recognition vocabularies on the basis of the co-occurrence information and/or the semantic attributes in the case of the preceding best solution and the following best solution being coincident with each other.

9. The speech recognition system according to claim 4, wherein the degree of association calculation means calculates a degree of association on the basis of at least one of: the number of solutions in which individual solutions in the preceding N best solutions agree with individual solutions in the following N best solutions; differences between the ranks based on the recognition scores in the preceding N best solutions and the ranks based on the recognition scores in the following N best solutions, individual solutions in the preceding N best solutions being coincident with individual solutions in the following N best solutions; a time difference between time at which the preceding N best solutions have been output and time at which the following N best solutions have been output; differences between positions on the time series at which the plurality of groups of the preceding N best solutions appear and the positions on the time series at which the plurality of groups of the following N best solutions appear, in a case that a plurality of groups of the preceding N best solutions are obtained by comparing a first utterance with a plurality of recognition vocabularies, and a plurality of groups of the following N best solutions are obtained by comparing a second utterance made by a user who is different from a user of the first utterance with the plurality of recognition vocabularies.

10. The speech recognition system according to claim 9, wherein, the larger the number of solutions, in which the individual solutions in the preceding N best solutions agree with the individual solutions in the following N best solutions, and the smaller the differences between, regarding the solutions, in which the individual solutions in the preceding N best solutions agree with the individual solutions in the following N best solutions, the ranks based on the recognition scores in the preceding N best solutions and the ranks based on the recognition scores in the following N best solutions, the higher the degree of association calculated by the degree of association calculation means.

11. The speech recognition system according to claim 9, further comprising:
   a time information control means for assigning time information representing a current time to the N best solutions, and for writing the N best solutions including the time information assigned to the recognition result storage,
   wherein, the smaller the time difference between the current time represented by time information assigned to the preceding N best solutions and the current time represented by time information assigned to the following N best solutions, the higher the degree of association calculated by the degree-of-association calculation means.

12. The speech recognition system according to claim 9, wherein, in a case where a plurality of groups of the preceding N best solutions are obtained by comparing a first utterance with a plurality of recognition vocabularies, and a plurality of groups of the following N best solutions are obtained by comparing a second utterance made by a user who is different from a user of the first utterance with the plurality of recognition vocabularies, the smaller the differences between the positions, on the time series, at which the plurality of groups of the preceding N best solutions appear and the positions, on the time series, at which the plurality of groups of the following N best solutions appear, the higher the degree of association calculated by the degree of association calculation means.

13. The speech recognition system according to claim 12, further comprising:
   a function word dictionary for storing function words representing the positions at which utterances appear in association with the positions,
   wherein, when the following best solution in any one group of the following N best solutions out of the plurality of groups of the following N best solutions agrees with a function word, the degree of association calculation means sets the position represented by the function word as the position at which a group of the following N best solutions appear, the group of the following N best solutions being chronologically next to the one group of the following N best solutions including the following best solution, which agrees with the function word.

14. The speech recognition system according to claim 13, further comprising:
   a function word extraction means that extracts, from the function word dictionary, function words corresponding to the positions, on the time series, at which the plurality of groups of the preceding N best solutions appear,
   wherein the output presentation means presents the function words extracted by the function word extraction means in association with the individual preceding best solutions of the plurality of groups of the preceding N best solutions.

15. A speech recognition method comprising:
   adding an identifying code to utterance data corresponding to signals generated by utterances of each of a plurality of users, the identifying code being available for identifying each of the users;
   rating the utterance data by a value for each of the identifying codes, the value being determined on the basis of comparison of a characteristics of the utterance data with characteristics of word information selected from a plurality of sets of word information stored;
   storing N pieces of word information corresponding to N sets of the utterance data, the utterance data having a same identifying code, the N sets of utterance data having the value within top N, N being an integer equal to one or more;
   selecting posterior N pieces of word information posterior in time to prior N pieces of word information, the identifying codes of the utterance data relative to the posterior and prior N pieces of word information being spoken by the users that are different from each other;
   calculating a degree of relationship between the prior and posterior N pieces of word information, the degree of relationship being capable of rating a fact of the utterance relative to the posterior N pieces of word information being performed later than the utterance relative to the prior N pieces of word information;

determining the posterior N pieces of word information corresponding to an utterance performed later than the utterance relative to the prior N pieces of word information; and determining the posterior N pieces of word relative to an utterance as a response to the utterance relating to the prior N pieces of word information on the basis of a predetermined condition.

16. A speech recognition method according to claim 15, further comprising:

determining whether a first prior word information of the prior N pieces of word information agrees with a first posterior word of the posterior N pieces of word information, the first prior word information corresponding to the utterance data having a highest value within data relative to the prior N pieces of word information, the first posterior word information corresponding to the utterance data having a highest value within data relative to the posterior N pieces of word information.

17. A speech recognition method according to claim 16, further comprising:

replacing the first prior word information of the prior N pieces of word information with the first posterior word of the posterior N pieces of word information in the case that the first prior and posterior vocabularies information disagree.

* * * * *